(12) United States Patent
Halford et al.

(10) Patent No.: US 11,896,045 B2
(45) Date of Patent: Feb. 13, 2024

(54) AUTOMATED FOOD COATING SYSTEM

(71) Applicant: CFA Properties, Inc., Atlanta, GA (US)

(72) Inventors: Chris Halford, Atlanta, GA (US); Scott Herdic, Atlanta, GA (US)

(73) Assignee: CFA Properties, Inc., Atlanta, GA (US)

( * ) Notice: Subject to any disclaimer, the term of this patent is extended or adjusted under 35 U.S.C. 154(b) by 97 days.

(21) Appl. No.: 17/514,124

(22) Filed: Oct. 29, 2021

(65) Prior Publication Data

US 2022/0132905 A1 May 5, 2022

Related U.S. Application Data

(60) Provisional application No. 63/107,759, filed on Oct. 30, 2020.

(51) Int. Cl.
*A23P 20/12* (2016.01)
*A23P 20/17* (2016.01)

(52) U.S. Cl.
CPC ............... *A23P 20/12* (2016.08); *A23P 20/17* (2016.08)

(58) Field of Classification Search
CPC .......... A23P 20/12; A23P 20/13; A23P 20/17; A23B 4/10; A23B 4/325; A23L 13/57
USPC ........................... 118/13, 19, 24; 99/494, 504
See application file for complete search history.

(56) References Cited

U.S. PATENT DOCUMENTS

| | | | | |
|---|---|---|---|---|
| 2,625,903 | A | * | 1/1953 | Opie .................... A23G 3/2076 118/19 |
| 2,794,457 | A | * | 6/1957 | Nicodemus ............. A47F 13/08 D7/700 |
| 7,231,885 | B1 | | 6/2007 | Nothum et al. |
| 9,370,197 | B1 | | 6/2016 | Karpinsky et al. |
| 2007/0196547 | A1 | | 8/2007 | King et al. |

FOREIGN PATENT DOCUMENTS

| | | |
|---|---|---|
| EP | 0 610 840 A2 | 8/1994 |
| WO | WO 2006/061576 A1 | 6/2006 |
| WO | WO 2019/125157 A1 | 6/2019 |

OTHER PUBLICATIONS

King, GB2459088, "Coating Dispersal Apparatus", published Oct. 14, 2009. (Year: 2009).*
WIPO Application No. PCT/US2021/057225, PCT International Search Report and Written Opinion of the International Searching Authority dated Feb. 10, 2022.

* cited by examiner

Primary Examiner — Karl Kurple
(74) Attorney, Agent, or Firm — ALSTON & BIRD LLP

(57) ABSTRACT

Embodiments of the present disclosure relate to an apparatus and method for automated food preparation systems. An example apparatus includes a body defining a first end configured to receive a food item, a second end opposite the first end, and a flow channel defined by an inner surface of the body extending between the first end and the second end. In an instance in which the food item is directed into the body via the first end, the flow channel is configured to distribute a coating material about the food item before the food item exits the body via the second end.

7 Claims, 32 Drawing Sheets

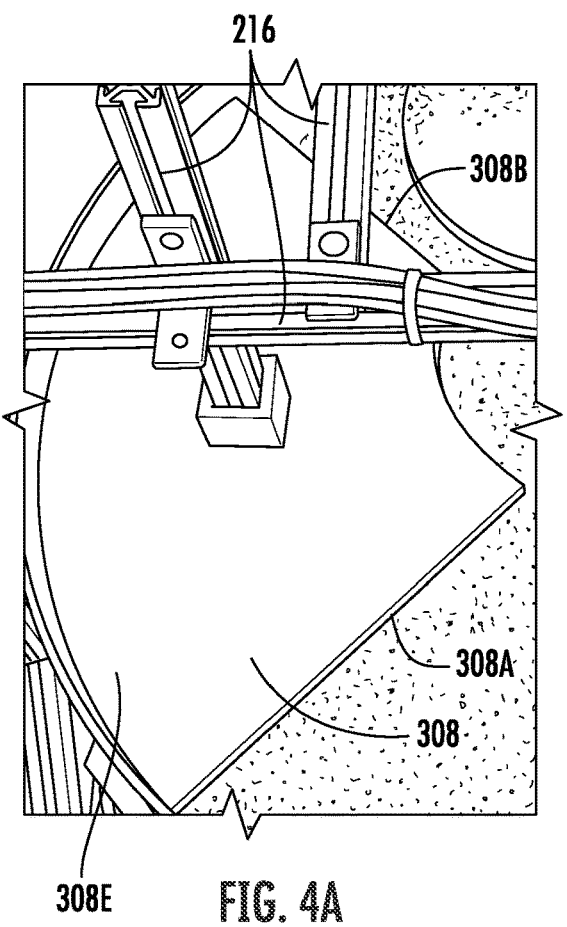 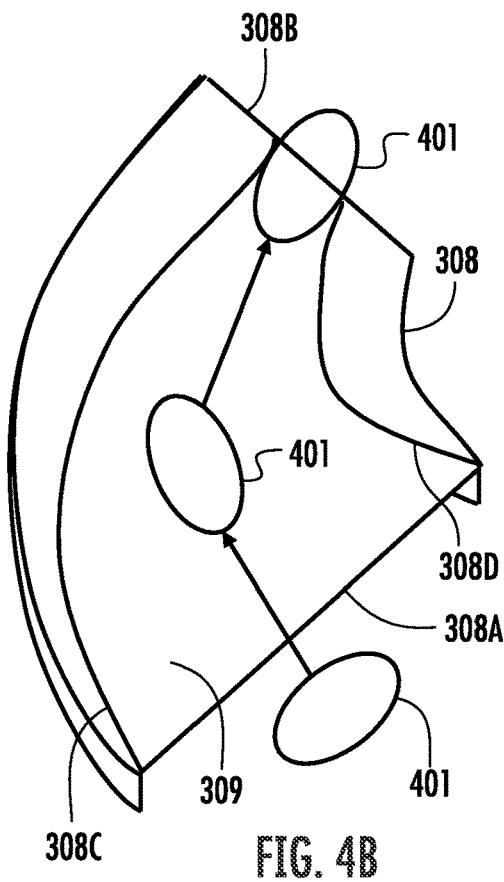
FIG. 4A  FIG. 4B
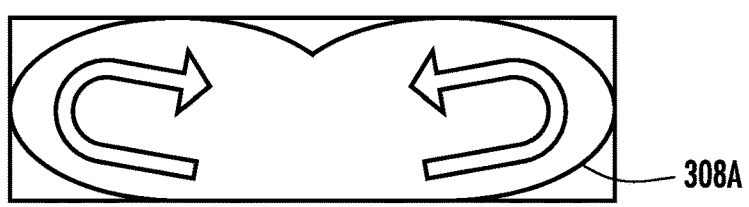
FIG. 4C
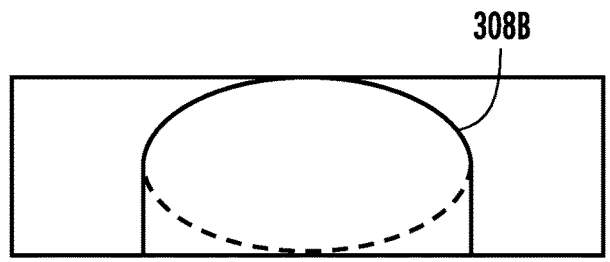
FIG. 4D

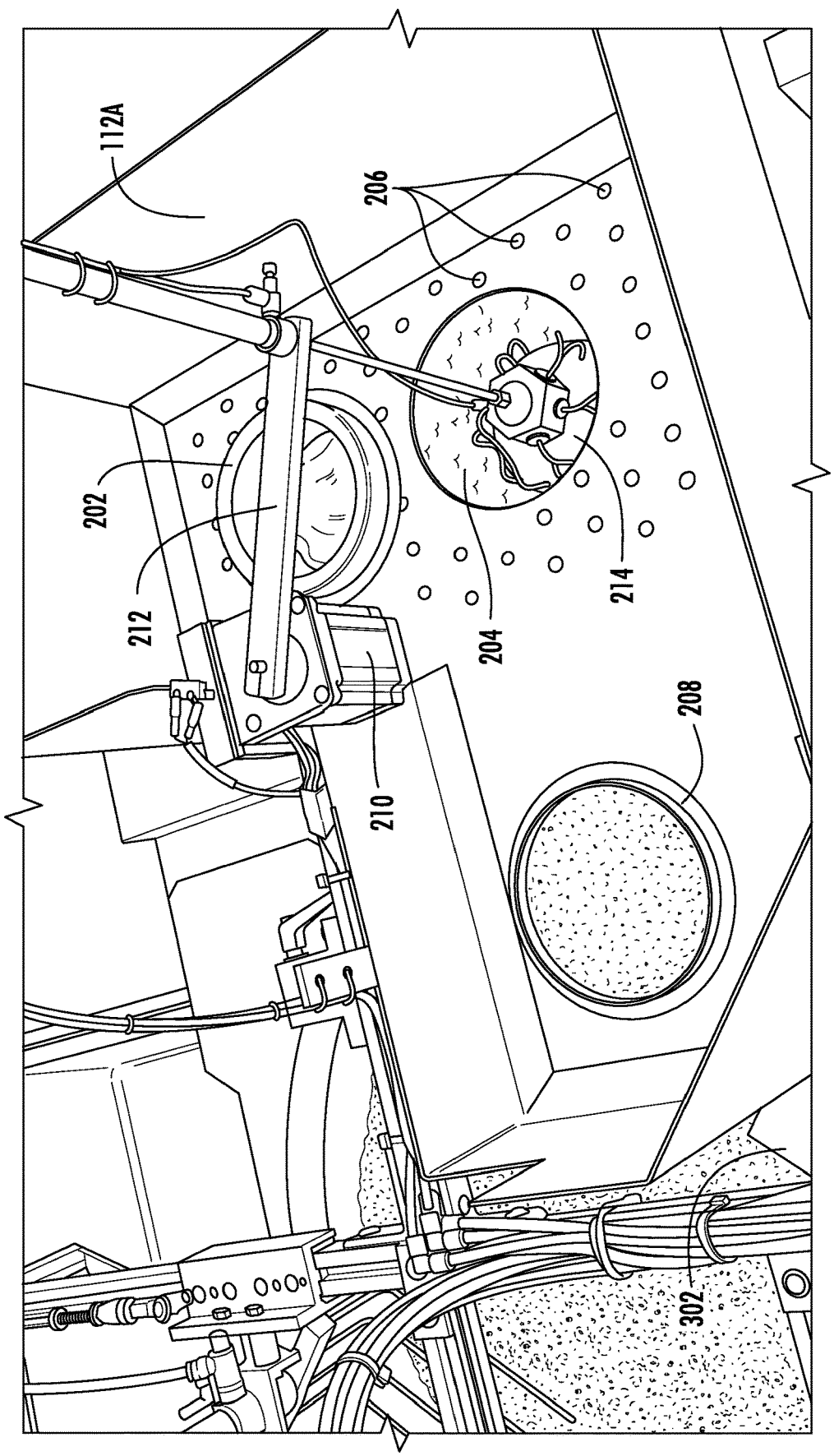

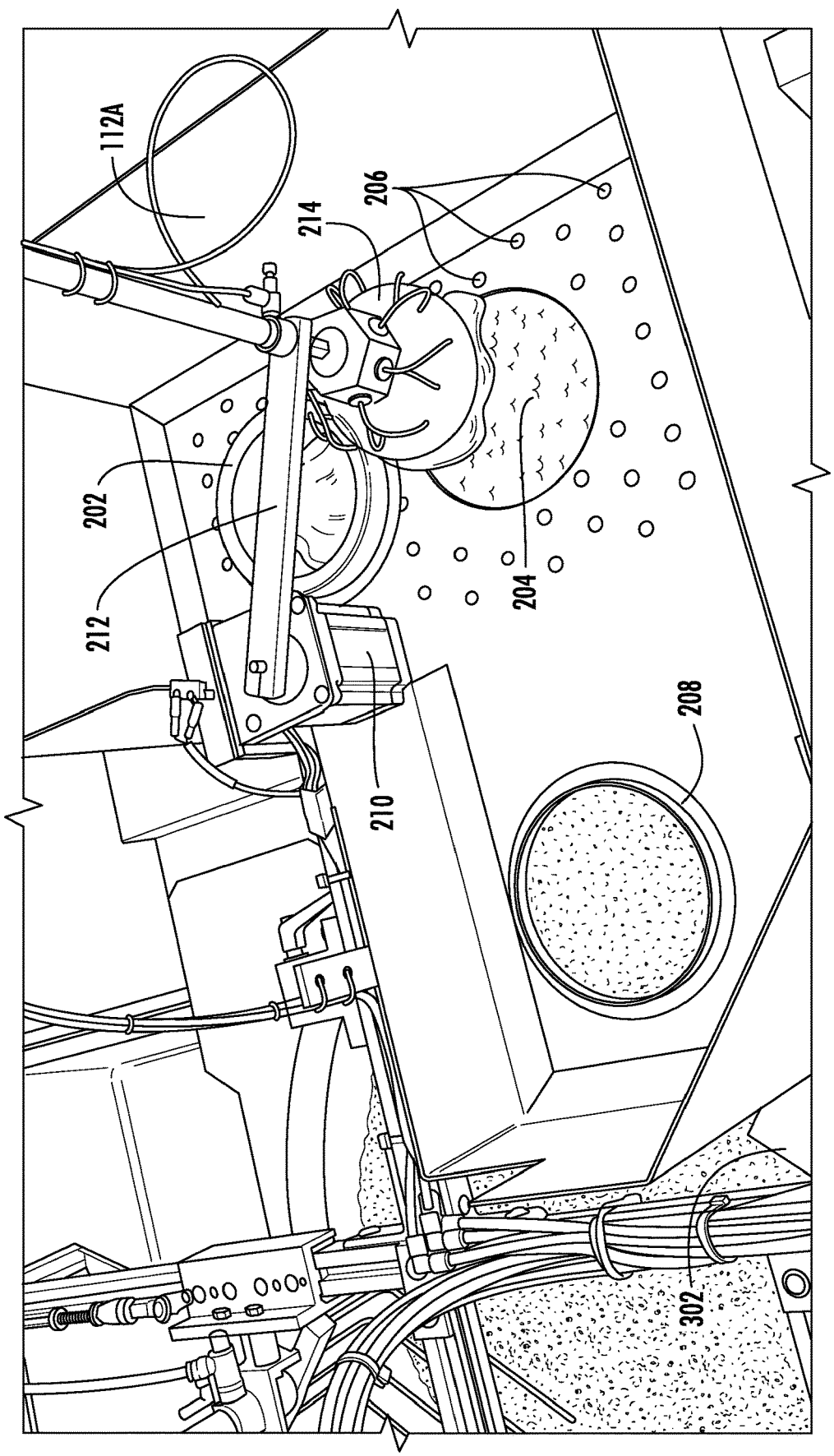

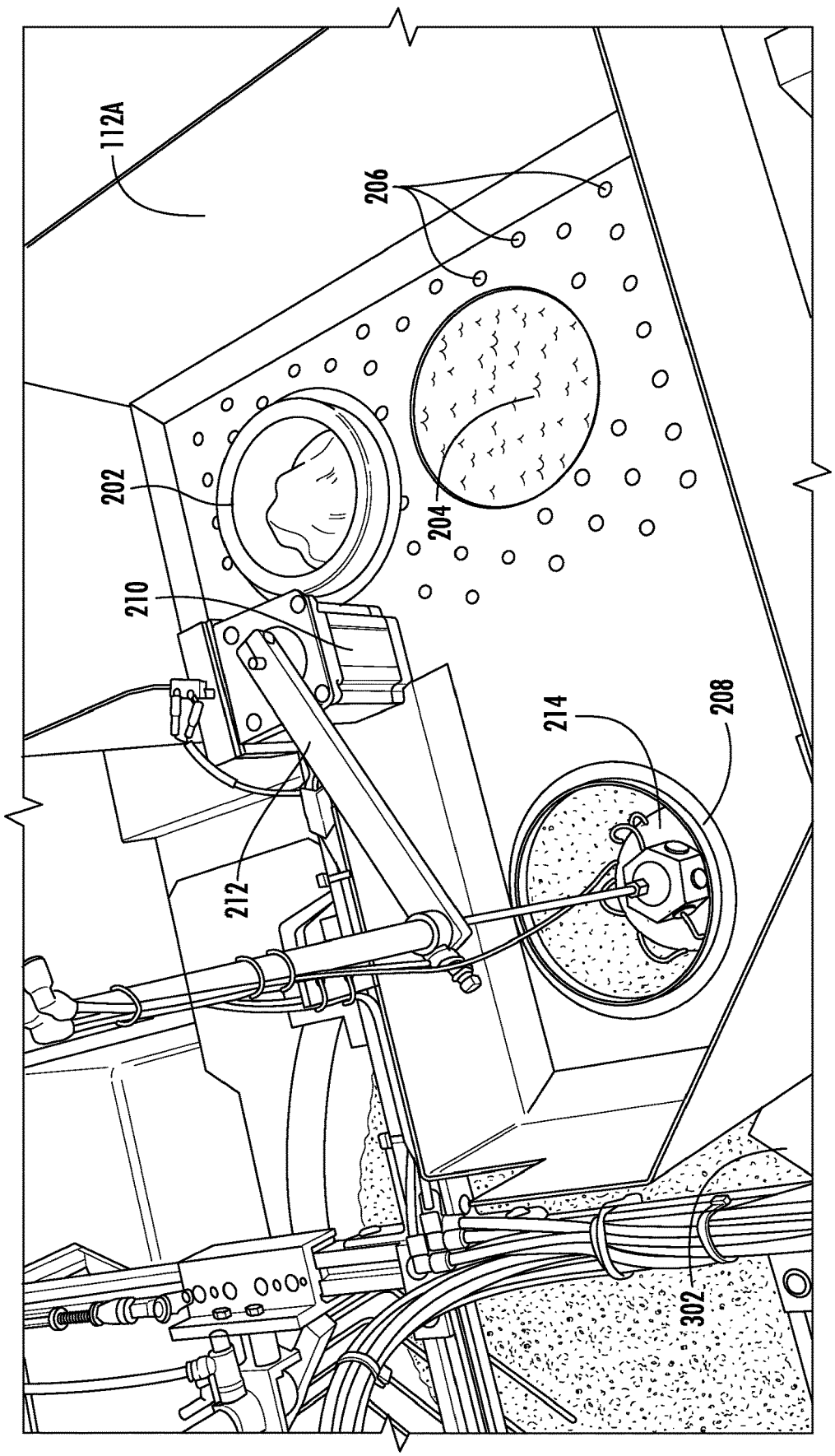

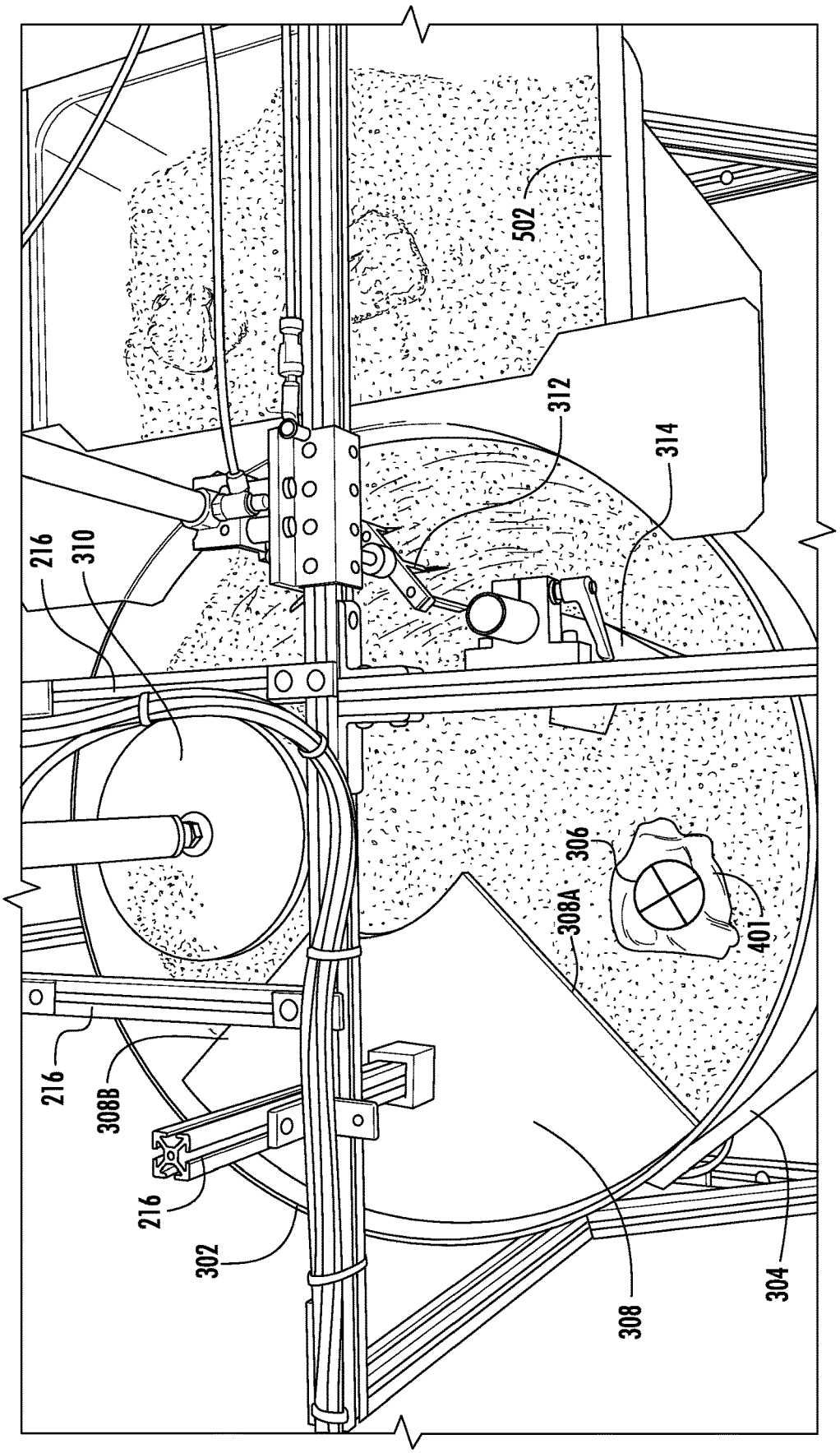

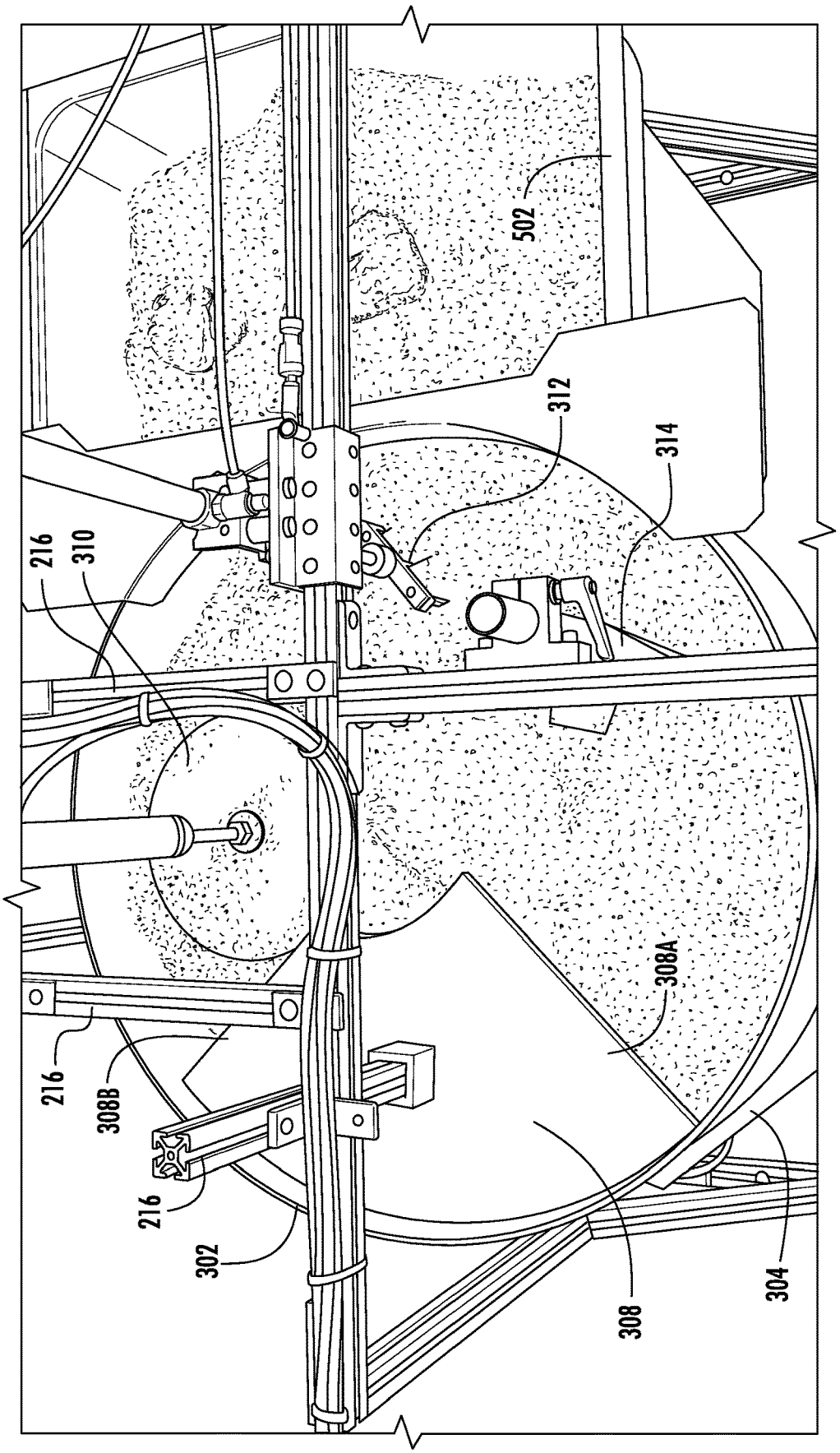

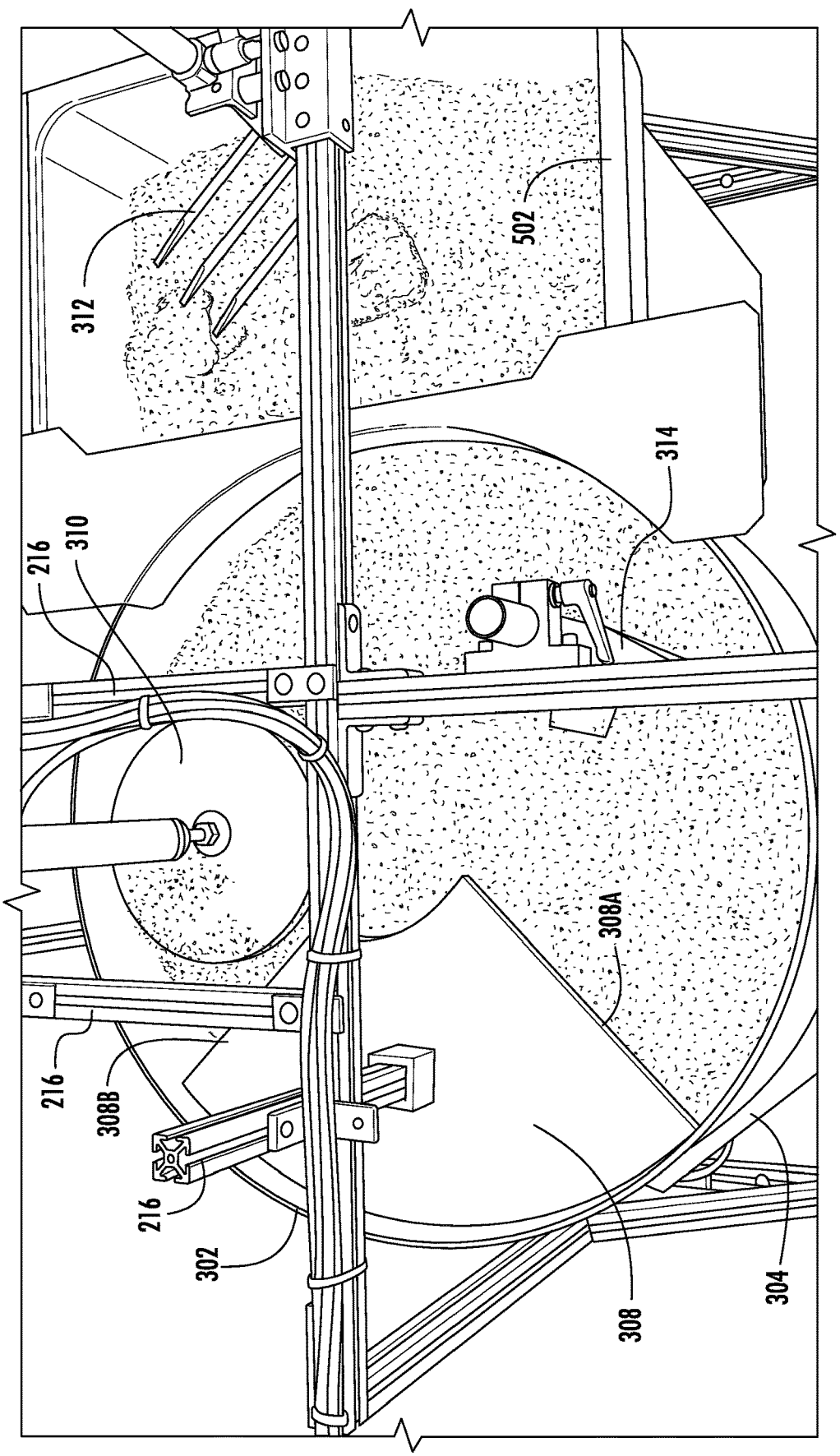

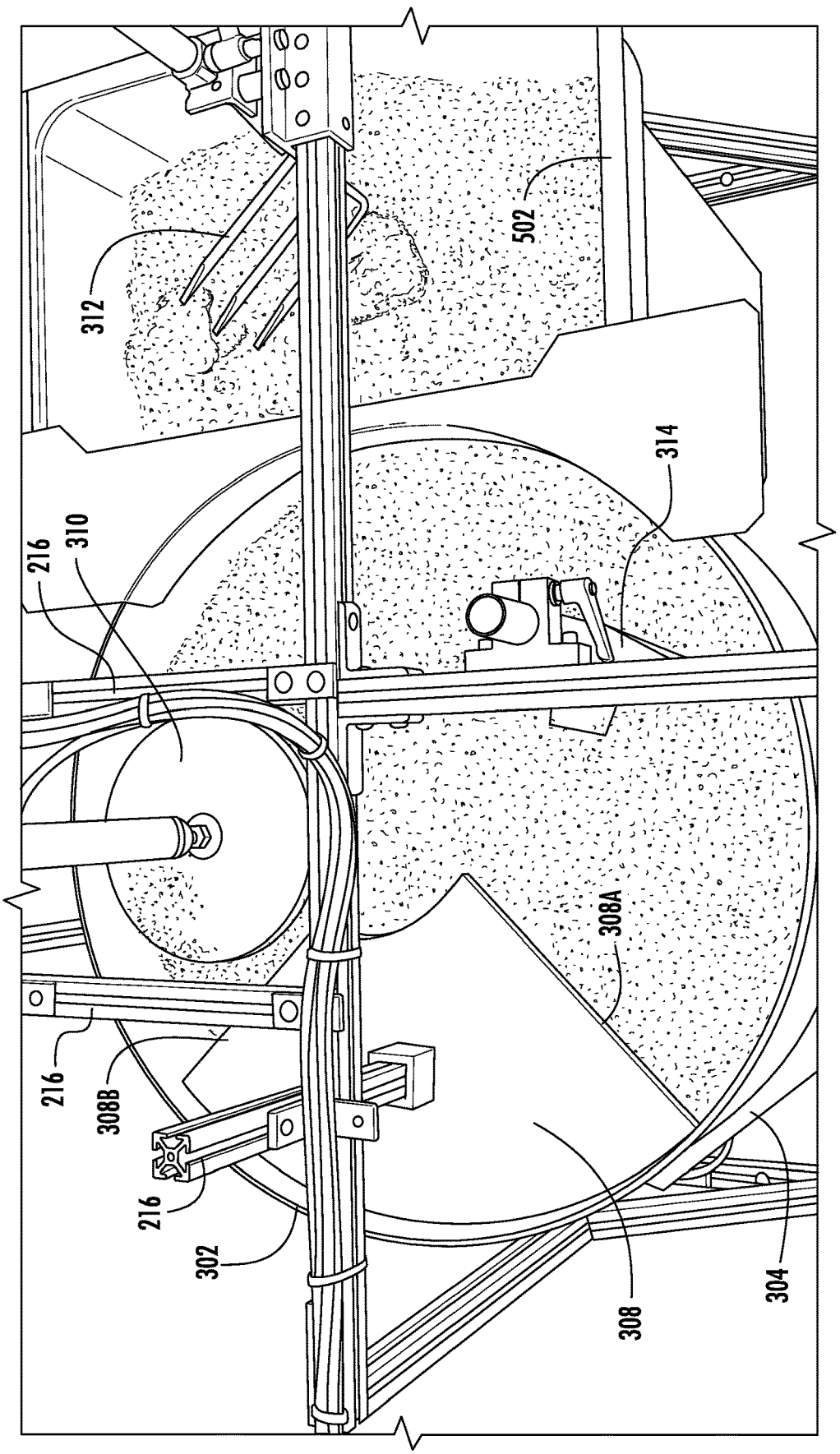

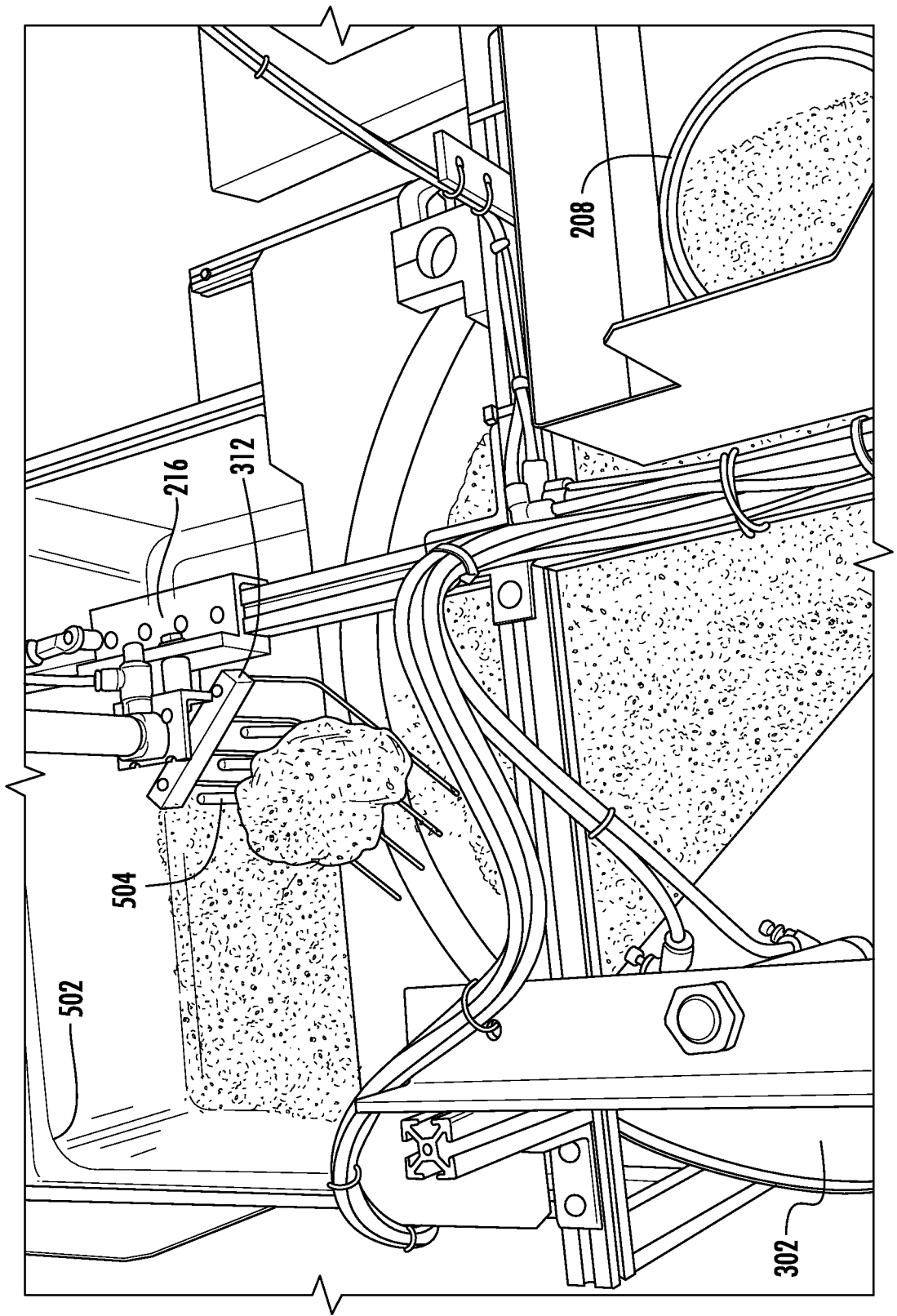

AUTOMATED FOOD COATING SYSTEM

CROSS-REFERENCE TO RELATED APPLICATIONS

This application claims priority to U.S. Provisional Application No. 63/107,759, filed Oct. 30, 2020, the contents of which application are incorporated by reference herein in their entirety.

TECHNOLOGICAL FIELD

Example embodiments of the present disclosure relate generally to food service systems and, more particularly, to automated food preparation systems.

BACKGROUND

The food service industry relies upon efficiently providing customers with freshly prepared food items. Preparation apparatuses and devices may be used in this process to freshly combine various food items made-to-order (e.g., poultry products, potato products, food batter, spice mixes, etc.). These preparation devices may include several interworking elements, subsystems, or the like used to prepare each food item for a customer's order prior to, or after, cooking the food item. These devices may further be formed in conjunction with other kitchen equipment (e.g., refrigerators, grills, warming stations, and/or the like).

BRIEF SUMMARY

Embodiments of the present disclosure relate to apparatuses, devices, systems, and methods for automated food preparation. An example apparatus for coating a food item may include a body defining a first end configured to receive a food item, a second end opposite the first end, and a flow channel defined by an inner surface of the body extending between the first end and the second end. In an instance in which the food item is directed into the body via the first end, the flow channel may be configured to distribute a coating material about the food item before the food item exits the body via the second end.

In some embodiments, the second end may be configured to define a surface profile of the coating material proximate the second end in an instance in which the coating material is moved relative the body.

In some embodiments, a first cross-sectional area of the flow channel at the first end may be larger than a second cross-sectional area of the flow channel at the second end.

In some embodiments, a cross-sectional area of the flow channel may narrow from the first end to the second end.

In some embodiments, the inner surface of the body that defines the flow channel may further define at least one concave surface configured to distribute the coating material about the food item.

In some embodiments, the inner surface of the body that defines the flow channel may further define a pair of converging concave surfaces configured to collectively distribute the coating material about the food item.

In some embodiments, the body may be configured to receive the food item having a first orientation via the first end, and the flow channel may be configured to reorient the food item to a second orientation before the food item exits the body via the second end.

In some embodiments, the body further may define an outer surface opposite the inner surface, the outer surface may define an attachment mechanism configured to suspend the body above a coating material reservoir supporting the coating material. In an instance in which the coating material reservoir is moved relative the body, the second end may be configured to define a surface profile of the coating material supported by the coating material reservoir proximate the second end.

In some embodiments, the body may define a semicircular or arcuate shape.

An example system for coating a food item may include a flow tumbler that includes a body. The flow tumbler body may define a first end configured to receive a food item, a second end opposite the first end, and a flow channel defined by an inner surface of the body extending between the first end and the second end. The system may further include a coating material reservoir configured to support a coating material therein and configured to rotate about an axis. In an instance, in an instance in which the food item is rotated by rotation of the coating material reservoir into the body via the first end, the flow channel is configured to distribute the coating material about the food item before the food item exits the body via the second end.

In some embodiments, a first cross-sectional area of the flow channel at the first end may be larger than a second cross-sectional area of the flow channel at the second end.

In some embodiments, the inner surface of the body defining the flow channel further may define a pair of converging concave surfaces configured to collectively distribute the coating material about the food item.

In some embodiments, the body may be configured to receive the food item having a first orientation via the first end, and the flow channel may be configured to reorient the food item to a second orientation before the food item exits the body via the second end.

In some embodiments, the body may further define an outer surface opposite the inner surface, the outer surface may define an attachment mechanism configured to suspend the body above the coating material reservoir. In an instance in which the coating material reservoir is rotated relative the body, the second end may be configured to define a surface profile of the coating material supported by the coating material reservoir proximate the second end.

In some embodiments, the system may further include a compression device suspended above the coating material reservoir. The compression device may be configured to move between an extended configuration and a retracted configuration. In the extended configuration, a pressing surface of the compression device may at least partially contact the food item exiting the body of the flow tumbler via the second end. In the retracted configuration contact between the pressing surface and the food item may be precluded.

In some embodiments, the system may further include an item retrieval lift configured to move relative the coating material reservoir and retrieve one or more coated food items from the coating material reservoir.

In some embodiments, the system may further include a coating material distribution plow configured to redistribute the coating material within the coating material reservoir.

In some further embodiments, the coating material distribution plow may further define one or more prongs extending at least partially into the coating material supported by the coating material reservoir. In an instance in which the coating material reservoir rotates about the axis, the one or more prongs may be configured to redistribute the coating material within the coating material reservoir to a substantially uniform surface profile.

BRIEF DESCRIPTION OF THE SEVERAL VIEWS OF THE DRAWINGS

Figure 1:
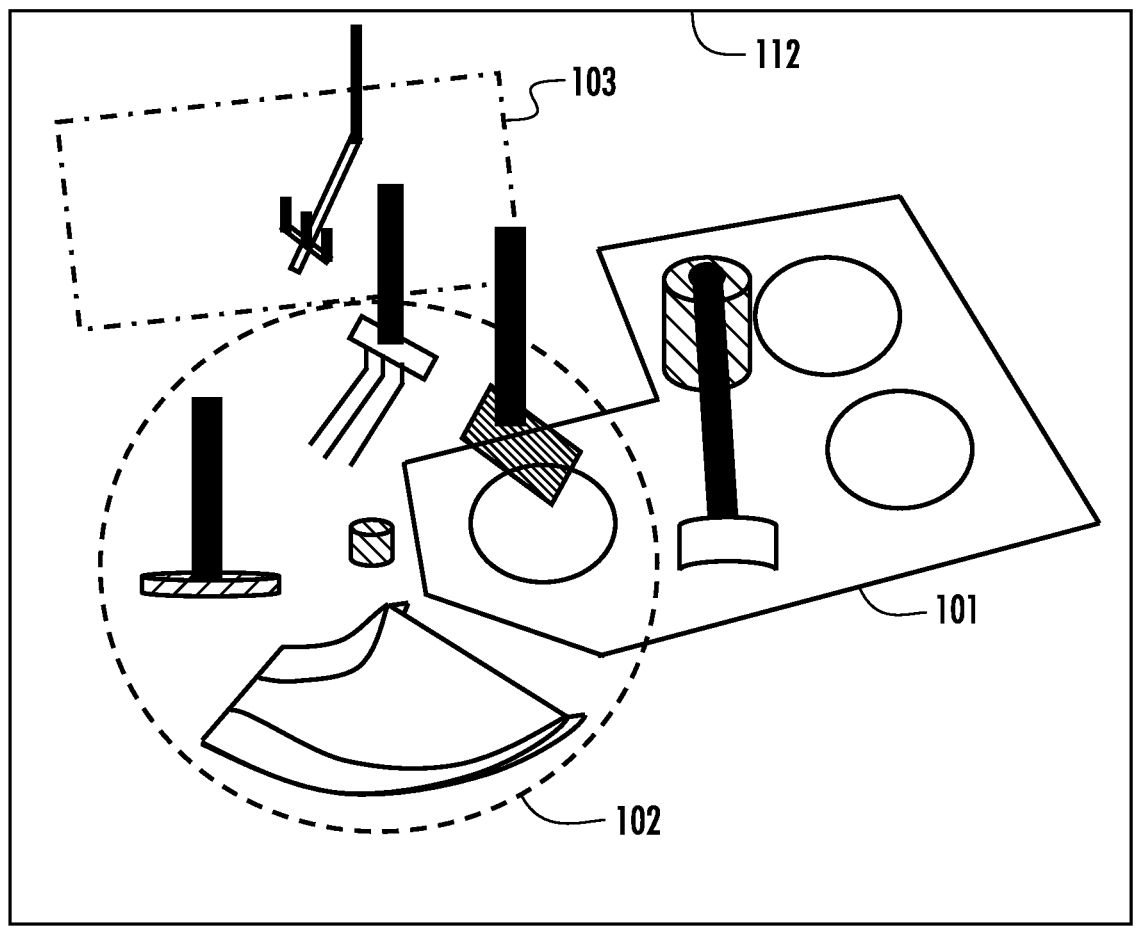
Figure 2A:
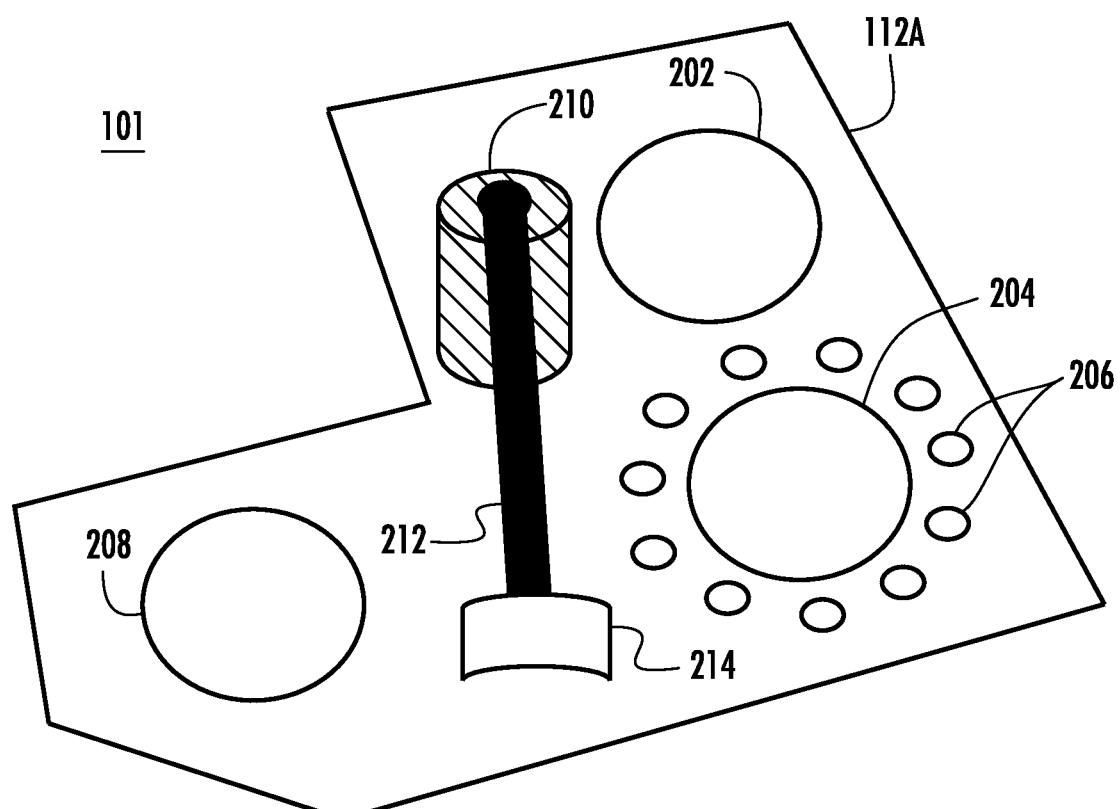
Figure 2B:
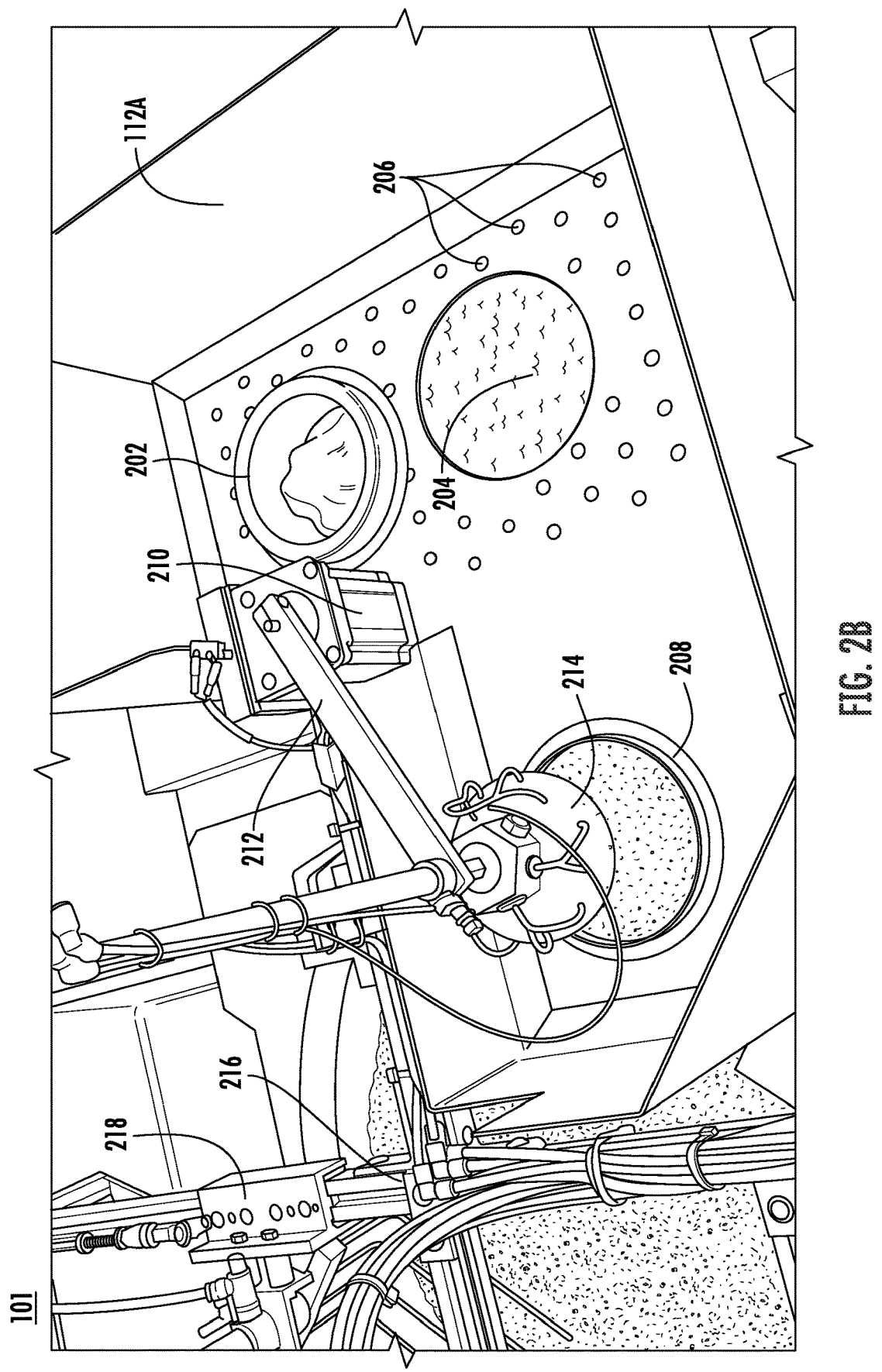
Figure 3:
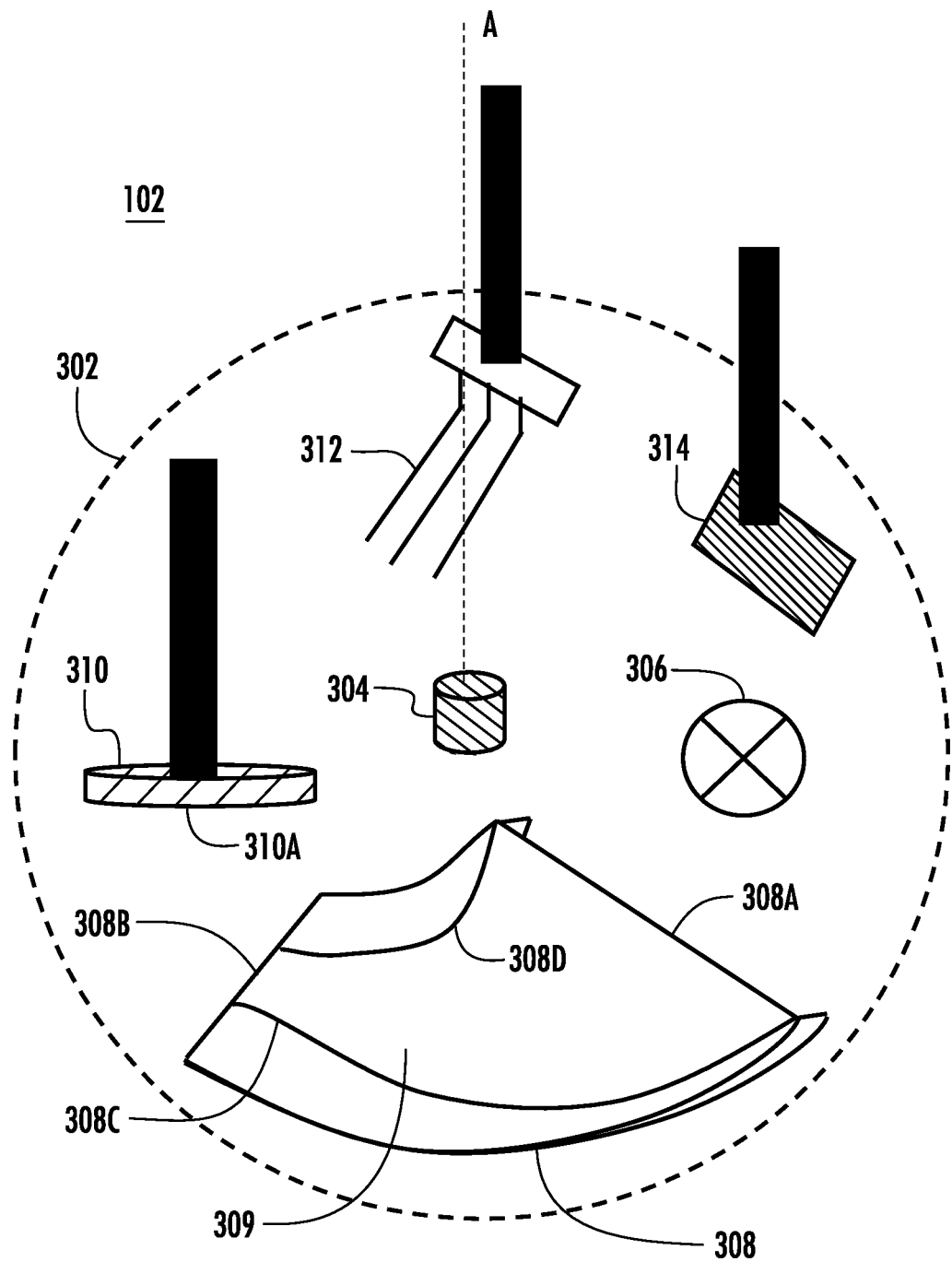
Figure 5:
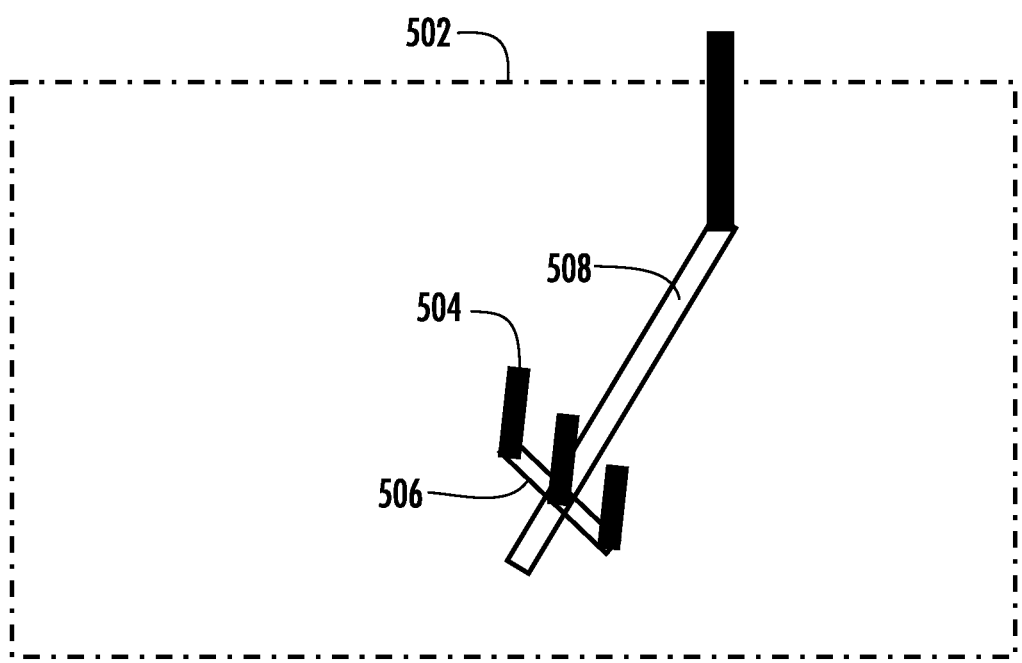
Figure 6:
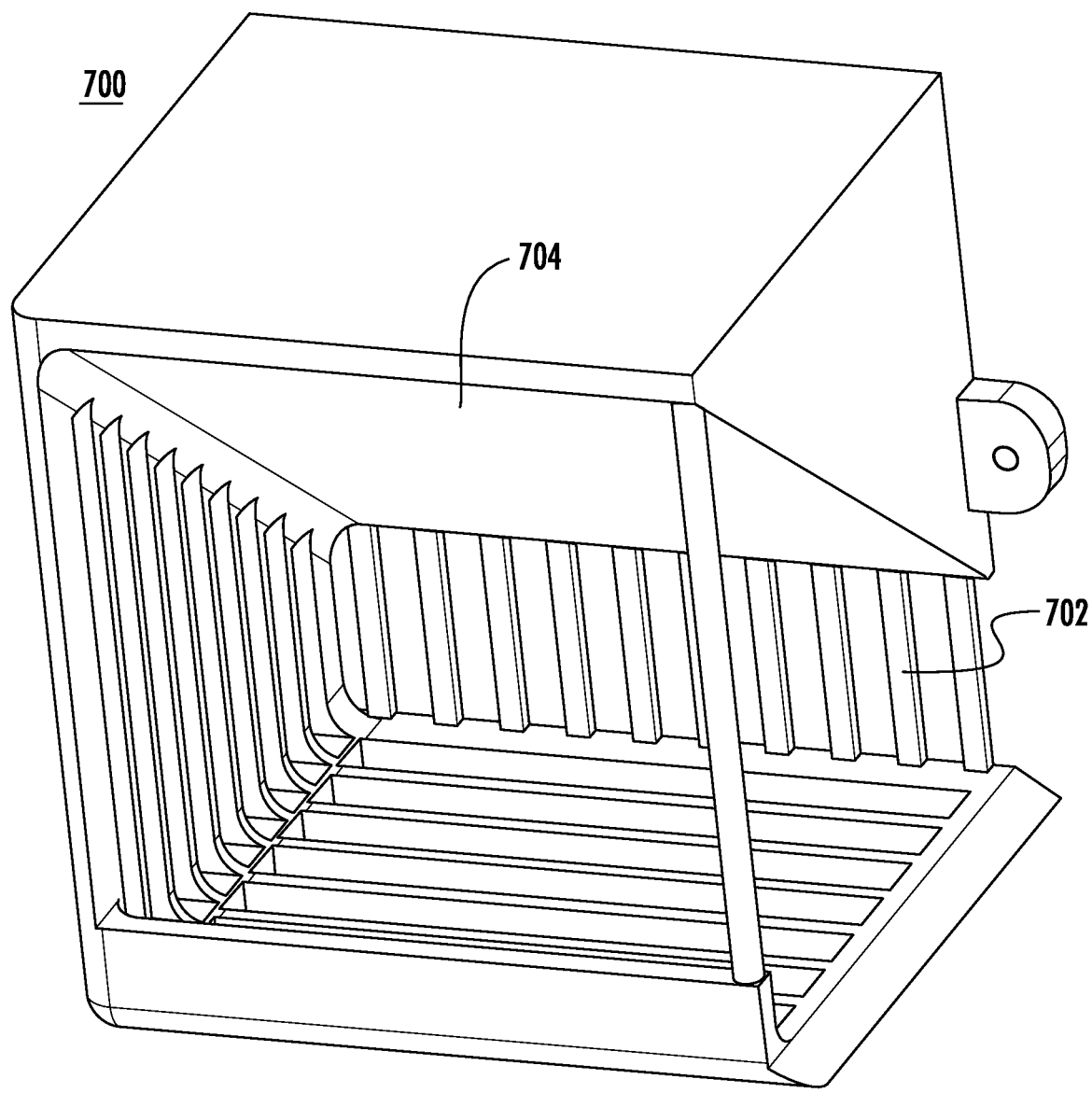
Figure 10:
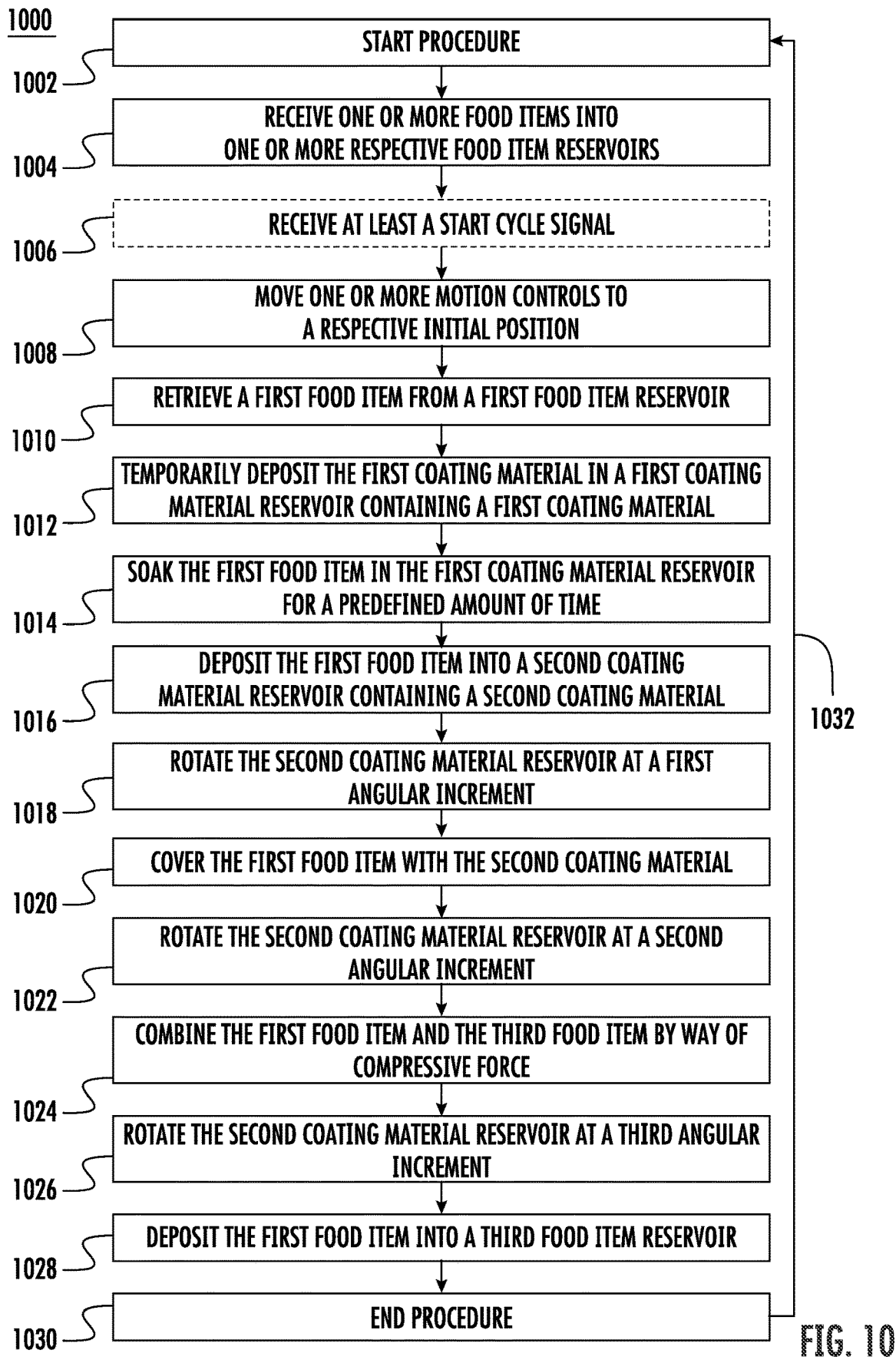
Figure 11:
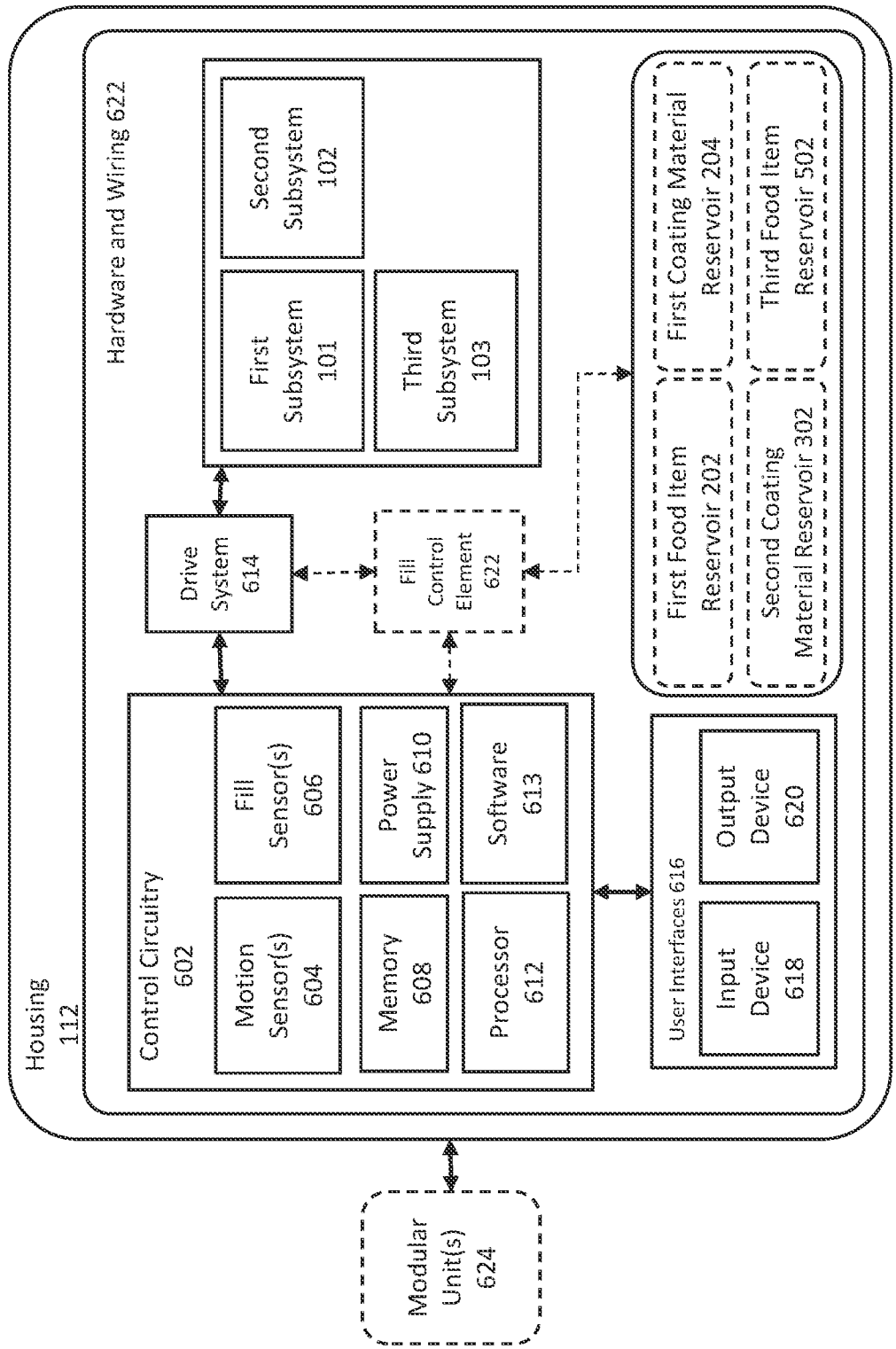

Having thus described the invention in general terms, reference will now be made to the accompanying drawings, which are not necessarily drawn to scale, and wherein:

FIG. 1 schematically illustrates an automated food coating system according to various example embodiments;

FIGS. 2A-2B illustrate an automated batter subsystem of an automated food coating system according to various example embodiments;

FIG. 3 illustrates an automated breading subsystem of an automated food coating system according to various example embodiments;

FIGS. 4A-4D illustrate a flow tumbler of an automated breading subsystem according to various example embodiments;

FIG. 5 illustrates an automated food receptacle subsystem of an automated food coating system according to various example embodiments;

FIG. 6 illustrates a rotatable basket for use with various example embodiments;

FIGS. 7A-7J illustrate a movement operation cycle of the automated batter subsystem of FIGS. 2A-2B according to an example embodiment;

FIGS. 8A-8H illustrate a movement operation cycle of the automated breading subsystem of FIGS. 3-4D according to an example embodiment;

FIGS. 9A-9E illustrate a movement operation cycle of the automated food receptacle subsystem of FIG. 5 according to an example embodiment;

FIG. 10 illustrates a flow chart depicting an example movement operation cycle of an automated food coating system according to example embodiments; and FIG. 11 illustrates a schematic view of an automated food coating system and related circuitry components.

DETAILED DESCRIPTION

Some embodiments of the present invention will now be described more fully hereinafter with reference to the accompanying drawings, in which some, but not all, embodiments of the invention are shown. Like reference numerals refer to like elements throughout. Indeed, various embodiments of the invention may be embodied in many different forms and should not be construed as limited to the embodiments set forth herein. Rather, these embodiments are provided so that this disclosure will satisfy applicable legal requirements.

As used herein, the term "or" is used in both the alternative and conjunctive sense, unless otherwise indicated. The term "along," and similarly utilized terms, means near or on, but not necessarily requiring directly on an edge or other referenced location. The terms "approximately," "generally," and "substantially" refer to within manufacturing and/or engineering design tolerances for the corresponding materials and/or elements unless otherwise indicated. Thus, use of any such aforementioned terms, or similarly interchangeable terms, should not be taken to limit the spirit and scope of embodiments of the present invention.

As used herein, reference is made to an automated food coating system for use in conjunction with preparation of one or more food items. The present disclosure, however, contemplates that the automated food coating system of the present disclosure may be equally applicable to other applications in which moving, retrieving, depositing, emptying, filling, sorting, and/or manipulating items is advantageous. Similarly, reference herein may be made to food service environments, such as restaurant kitchens, in which at least some of the various embodiments may be implemented. However, the present disclosure contemplates that the automated food coating system described herein may be used in any environment based upon the intended application of the system.

Additionally, reference herein may be made to a "food item," "food product," or similar terms that may, for example, refer to chicken, fish, beef, or any other such item that may be consumed. Although described herein with reference to an example chicken breast, the present disclosure contemplates that the automated food coating systems of the present application may be used with food items or products of any type or dimension (e.g., size or shape). Reference herein may also be made to coating materials including, for example, breadcrumbs, batter, oil, milk, seasonings, and/or any material that may be used in conjunction with a food item, such as in preparing a food item for consumption. In some embodiments, one or more food items may be at least partially submerged in one or more other coating materials in order to sufficiently coat (e.g., bread, season, etc.) a first food item with the one or more coating materials prior to, or after, cooking (e.g., frying, baking, grilling, etc.). In other embodiments, a first food item may be coated with one or more coating materials without additional cooking operations (e.g., dipping a cooked item in an outer coating/seasoning). The present disclosure contemplates that the automated food coating system may also be used in conjunction with cooking operations and a cooking medium (e.g., heated frying oil, boiling water, etc.). For example, additional modules may be added to the automated food coating system described herein to further fry a food item after a coating operation (e.g., submersion in milk wash, breading, etc.).

Furthermore, reference herein may be made with regard to use of the automated food coating system in conjunction with a "cooking operation." The present disclosure, however, contemplates that the automated food coating system may be equally applicable to other applications in which timed exposure of food items to various environments and elements (e.g., thawing, freezing, submersion, rinsing, storage of items, the like, or combinations thereof) is desired.

Overview

As described above, the food service industry often looks for ways to increase productivity while maintaining or reducing staffing requirements. In particular, restaurants bear substantial costs associated with hiring and maintaining a sufficiently large staff to process a similarly large customer demand for food during short time intervals (e.g., breakfast, lunch, and/or dinner). Traditionally, staff members may each be assigned one or more tasks (e.g., customer interaction, food preparation, cooking, cleaning, etc.) within the restaurant and may, due to order quantity and food preparation time, be required to frequently monitor or physically attend to these tasks simultaneously. By way of example, a staff member may be assigned to mixing frying batter ingredients and/or breading one or more food items to fulfil customer orders. In doing so, the staff member may be required to monitor (e.g., be physically located near), for example, spice mixes, batter, and/or chicken quantities. Further, the staff member may be required to remain near a food preparation station to, for example, ensure the correct amount of food items are prepared as well as to ensure the quality of the food items that are cooked and subsequently sold. In this way, conventional food preparation operations limit the availability of staff to perform multiple or simultaneous tasks and further require an increased number of staff to ensure timely fulfilment of customer orders. Moreover, conventional food preparation operations introduce additional health concerns as staff members must frequently handle raw food products for extended periods of time increasing the risk for cross-contamination or infection by food borne bacteria.

To solve these issues and others, example implementations of embodiments of the present application may provide an automated food coating system that allows for automated preparation (e.g., submersion of a food item in a liquid batter and rolling of the food item in breading) and automated removal of the prepped food items (e.g., removal from the batter reservoir and breading container). In this way, the automated food coating system described hereafter allows for tasks that require organized operations for combining food items prior to, or after, cooking for a set amount of time (e.g., frying seasoned waffle fries, frying breaded chicken nuggets, etc.) to be performed without constant manual staff member activity. Therefore, food preparers may instead perform additional tasks (e.g., assemble orders, clean, etc.) during the same period of time required for the automated food coating system to operate. In doing so, the automated food coating system may allow increased staffing flexibility by alleviating the cost and scheduling requirements associated with high demand periods (e.g., lunch, dinner, scheduled events, etc.) that may only constitute a small portion of the working day. Furthermore, the automated food coating system may further operate to limit exposure of staff to potentially dangerous cooking and preparation elements and/or eliminate tasks associated with an increased risk of injury (e.g., handling raw chicken or eggs, pressing operations, cutting operations, etc.).

Example System

With reference to FIG. 1, an example automated food coating system 100 (e.g., a system for coating a food item and/or system 100) is illustrated. As described hereafter, the system 100 may be used with raw food items in order to properly prepare these food items for a cooking operation. The present disclosure, however, contemplates that the system 100 may be equally applicable to cooked (e.g., in whole or in part) food items. Regardless of the configuration or orientation of the components described hereafter, the automated food coating system 100 of the present disclosure may be configured with at least a first subsystem 101, a second subsystem 102, and/or a third subsystem 103. The first subsystem 101 may be configured for food item storage, food item retrieval, and/or mixing of a plurality of food items or ingredients. The second subsystem 102 may be configured for food item storage, receipt of one or more food items, coating of a food item, mixing of a plurality of food items or ingredients thereof, and/or one or more other food manipulation operations (e.g., pressing, cutting, and/or the like). The third subsystem 103 may be configured for receipt and/or retrieval of one or more food items and/or storage of one or more food items. In some embodiments, the storage of one or more food items by the one or more sub systems (e.g., first sub system 101, second sub system 102, and/or third sub system 103) may be for a predetermined time period (e.g., the time required for the subsystem to perform one or more operations on the stored food items, a safe holding time prior to cooking, etc.). In some embodiments, at least some of the plurality of subsystems (e.g., first subsystem 101, second subsystem 102, and/or third subsystem 103) may be configured to share one or more structural components, for example, the plurality of subsystems may share a common housing component (e.g., housing 112 or the like).

By way of example, the automated food coating system 100 may include a housing 112 formed of a corrosion resistant food grade material (e.g., stainless steel or the like) that defines an enclosure for supporting one or more components of the various subsystems and one or more food items therein. The housing 112 may further support various temperature control elements, electrical circuitry, and/or mechanical devices as described hereafter for controlling and facilitating safe food storage, mixing operations, and movement of food items and components of the automated food coating system 100. In order to prevent food spoilage, due to, for example, unsafe storage temperatures, a plurality of food storage reservoirs associated with one or more subsystems 101, 102, 103, may be configured with sensors and/or circuitry (e.g., temperature sensors, timing circuits, and/or the like) described hereafter, and one or more of these elements may be enclosed or otherwise shielded from the coating material (e.g., milk wash, liquid batter, etc.). The housing 112 may further define one or more openings configured to allow selective access to the food storage reservoirs and/or components associated with one or more subsystems (e.g., wiring cabinets, refrigeration systems, etc.).

In some embodiments, the food storage reservoirs may be sealed with one or more tops, lids, or the like to minimize the amount of heat exchanged between the raw food items and/or coating material (e.g., milk, chicken, etc.) within the reservoirs and an external environment (e.g., kitchen air, etc.). In such an embodiment, the lid(s) for each reservoir may further act as hygienic shielding to decrease the risk of food contamination during, before, or after food preparation operations. The housing 112 may, in some embodiments, be at least partially formed of a high-density thermal insulating material (e.g., resistant to heat exchange). In some instances, the automated food coating system 100 may include various racks, shelves, containers, dispensers, and/or the like for supporting one or more food items therein before and/or after a preparation operation. The automated food coating system 100 may also be formed as a module of a larger restaurant kitchen unit (e.g., a modular component) including other devices for food item cooking and/or storage at various stages (e.g., fryers, refrigerators, freezers, microwaves, warming lamps, conveyor belts, etc.). The automated food coating system 100 may be attached to other modular units via the housing 112.

With reference to FIG. 2A, an example first subsystem 101 configured as an automated batter subsystem of the automated food coating system 100 is illustrated. As shown, the automated batter subsystem (e.g., the first subsystem 101) may include a housing 112A configured to support one or more components of the first subsystem 101. In some embodiments the housing 112A may refer to a portion of the housing 112 described above. In other embodiments, the housing 112A may refer to a distinct or separate housing associated with the first subsystem 101. As described herein, the automated batter subsystem may be configured to, for example, dip or otherwise coat a chicken breast in a milk wash, liquid batter, or the like. Although described herein with reference to a chicken breast as an example first food item, the present disclosure contemplates that the automated food coating system 100, or any portion or subsystem of the system 100, may be applicable for use with any food item (e.g., fish filets, beef, chicken wings, chicken tenders, among others) without limitation.

The first subsystem 101 may include a first food item reservoir 202. The first food item reservoir 202 may, in some embodiments, be formed as a cylindrical container for storing raw food items. For example, the first food item reservoir 202 may be configured to store a plurality of chicken breasts. The chicken breasts may be housed by the first food item reservoir 202 such that the chicken breasts are stacked vertically so as to be sequentially picked as described hereafter. The first food item reservoir 202 may be configured to store the one or more food items therein at a safe food storage temperature (e.g., 40 degrees Fahrenheit or the like) due to connection with a refrigeration system or the like. Said differently, in some embodiments, the first food item reservoir may be refrigerated. Although described herein with reference to a cylindrical container, the present disclosure contemplates that the first food item reservoir 202 may be dimensioned (e.g., sized and shaped) based upon the intended application of the first subsystem 101.

The first subsystem 101 may further include a first coating material reservoir 204. The first coating material reservoir 204 may, in some embodiments, also be formed as a cylindrical container for storing food items. For example, the first coating material reservoir 204 may be configured to store a fluid wash (e.g., milk wash) in which food items (e.g., chicken breasts) may be submerged. The first coating material reservoir 204 may be configured to store the one or more food items therein at a safe food storage temperature (e.g., 40 degrees Fahrenheit or the like) due to connection with a refrigeration system or the like. Although described herein with reference to a cylindrical container, the present disclosure contemplates that the first coating material reservoir 204 may also be dimensioned (e.g., sized and shaped) based upon the intended application of the first subsystem 101. Although described herein with reference to submerging, in whole or in part, the first food item in a fluid wash, the present disclosure contemplates that the first coating material reservoir 204 may, in some embodiments, define a holding reservoir in which a first coating material (e.g., milk wash) is applied to a first food item (e.g., a chicken breast). By way of example, the first coating material reservoir 204 may define a holding reservoir in which the first food item is stored or deposited as described herein. Such a holding reservoir may include a spraying system (e.g., pump, nozzles, etc.) configured to apply the first coating material (e.g., milk wash) to the first food item (e.g., one or more chicken breasts).

In some embodiments, the first food item reservoir 202 and the first coating material reservoir 204 may be combined as a single container. By way of example, the first coating material reservoir 204 may at least partially contain the first food item reservoir 202 such that the food items of the first food item reservoir 202 (e.g., raw chicken breasts) may be at least partially coated by the food items of the first coating material reservoir 204 (e.g., milk wash).

During one or more automated operations, one or more first food items (not shown), for example chicken breasts, may be taken from the first food item reservoir 202 and submerged in the one or more first coating materials (not shown), for example a milk wash, stored in the first coating material reservoir 204. In some embodiments, the first food item may be one or more portions of chicken, fish, steak, ground beef, turkey, cheese, vegetables, fruits, grain products, and/or the like. In some embodiments, the first coating material may be one or more of a milk wash, a frying batter, water, brine, melted butter, oil, and/or the like. In some embodiments, the first food item reservoir 202 and the first coating material reservoir 204 may comprise a single food item reservoir wherein a first food item is soaked in a first coating material until removed for preparation operations. In a particular example (not shown), a single reservoir may contain both the milk wash and the raw chicken breasts at least partially submerged therein. As shown by FIG. 2A, drain holes 206 may be positioned around at least the first coating material reservoir 204. Drain holes 206 may be configured to allow spilled fluids or the like to drain from the housing 112A and, for example, return to the first coating material reservoir 204. For example, if a first food product is submerged in a first coating material and then removed from the first coating material reservoir 204, excess amounts of the first coating material may spill onto the housing 112A and, via at least drain holes 206, return to the first coating material reservoir 204. In some embodiments, the drain holes 206 may drain into another food item reservoir or into a garbage receptacle to prevent contaminants from entering the first coating material reservoir 204.

With continued reference to FIG. 2A, the first subsystem 101 may include a retrieval arm 212. The retrieval arm 212 may be configured to engage with (e.g., pick up) one or more of the food items stored in the first food item reservoir 202 and/or the first coating material reservoir 204 and facilitate movement of the one or more food items. The retrieval arm 212 may define an attachment apparatus 214 (e.g., claw, articulating arm, suction cup, clamp, etc.) disposed at a free end of the retrieval arm 212 (e.g., an end of the retrieval arm 212 that extends at least partially over, or into, the reservoirs 202 and 204). The retrieval arm 212 and/or the attachment apparatus 214 may be configured to extend, at least partially, into the first food item reservoir 202 and the first coating material reservoir 204. For example, the retrieval arm 212 may move with respect to a horizontal plane (e.g., about a pivotal attachment point or socket joint) to position the attachment apparatus 214 over the first food item reservoir 202 and/or the first coating material reservoir 204. In accordance with such an example, the attachment apparatus 214 may be configured to move with respect to a vertical plane to extend downward to attach, grasp, etc. a food item and retract upward to remove the food item from the reservoir 202, 204. The movement of the retrieval arm 212 may be caused, in part, by motor 210 (e.g., a stepper motor, servo motor, etc.). In some embodiments, attachment apparatus 214 may be one or more of a vacuum plunger, mechanical claw, crane bucket, rotatable basket, the like, or combination thereof. In some embodiments, attachment apparatus 214 may be configured with a sensor (e.g., image sensor, scanner, etc.) to detect and locate one or more food items within a food item reservoir 202, 204. In such embodiments, the sensor of the attachment apparatus 214 may be further configured, with software and circuitry, to direct at least motor 210 to position the retrieval arm 212 over the detected food item such that attachment apparatus 214 may retrieve the detected food item. Said differently, the motor 210 may be operably coupled with the retrieval arm 212 so as to cause movement of the retrieval arm 212 relative the first subsystem 101.

As depicted in FIG. 2A, the first subsystem 101 may include a transfer opening 208 that allows the retrieval arm 212, via the attachment apparatus 214, to transfer one or more food items from the first subsystem 101 to one or more other subsystems (e.g., second subsystem 102, third subsystem 103, or the like). For example, the retrieval arm 212 may be positioned over the transfer opening 208 and extend downward through the transfer opening 208 so as to release a food item into a second coating material reservoir associated with the second subsystem 102. In some embodiments, the attachment apparatus 214 may be configured to drop a food item from a defined height or extend downward to release a food item proximate a surface of the second subsystem configured to receive the food item. Although illustrated as a circular opening, the transfer opening 208 may be dimensioned (e.g., sized and shaped) based upon the intended application of the first sub system 101.

With reference to FIG. 2B, the first subsystem 101 (e.g., an automated batter subsystem) of the automated food coating system 101 is illustrated. As shown, FIG. 2B depicts example embodiments of the housing 112A, the first food item reservoir 202, the first coating material reservoir 204, the drain holes 206, the transfer opening 208, the motor 210, the retrieval arm 212, and the attachment apparatus 214. Further, FIG. 2B illustrates a frame 216 configured to at least partially support the first subsystem 101 and/or provide electronic signal inputs/outputs (e.g., support electrical wiring pathways) to one or more components (e.g., the motor 210, the attachment apparatus 214, etc.) of the first subsystem 101. In some embodiments, the frame 216 may be configured to support any respective subsystem (e.g., first subsystem 101, second subsystem 102, third subsystem 103, etc.), or portions thereof, and/or provide electronic signal inputs/outputs (e.g., electrical wiring pathways or otherwise facilitate electrical communication) to components thereof.

The frame 216 may comprise one or more of structural elements (e.g., rails, beams, etc.), wires, hardware (e.g., screws, nuts, bolts, etc.), sensors, and/or the like. For example, the frame 216 may include one or more limit sensors positioned adjacent one or more corresponding ends of one or more horizontal rails described hereafter. The one or more limit sensors (e.g., limit switch, proximity sensor, capacitive sensor, precision touch sensor, magnetic sensor, laser sensors, optical sensors, motion sensors, and/or the like) may be configured to provide a signal to control circuitry (not shown) associated with the frame 216 indicating that one or more components supported by the frame (e.g., slider 218, or the like) are located at the end of a horizontal rail, vertical rail, or the like as described hereafter. Furthermore, in at least some embodiments, the one or more limit sensors may generate a signal indicative of one or more positions of the one or more frame components along a particular rail.

In some embodiments, the frame 216 may be connected to or otherwise include the motor 210, retrieval arm 212, and/or attachment apparatus 214, as described above. As described hereafter, the frame 216 may, via a drive system or otherwise, be configured to cause vertical movement, horizontal movement, or any combination thereof of the attachment apparatus 214 or similar components of the subsystems 101, 102, or 103 described herein. In some embodiments, the frame 216 may further comprise one or more coupling shafts that attach a first rail and a second rail, or to attach one or more rails to one or more structural components (e.g., housing 112 or the like). The frame 216 may be, in some embodiments, supported by or partially enclosed by the housing 112. The frame 216 may, in other embodiments, be positioned outside of the housing 112 encircled by a guard rail (not shown). In some embodiments, the guard rail may be formed a single piece of tubing, a set of rails or tubing, an additional housing component attached to the housing 112, grating, another physical barrier to cover the frame 216, and/or one or more electric sensors (e.g., light curtain safety apparatus, proximity sensor array, etc.) to prevent contact and/or damage to the frame and/or its components.

In some embodiments, the slider 218 may be supported by the frame 216 to facilitate linear motion of the slider 218 configured with attachment apparatus 214 in a horizontal direction of travel. Translation of the attachment apparatus 214, via motion of the slide 218, along one or more horizontal and/or vertical rails may be caused by a drive system (e.g., belt, chain, servos, linear and/or rotary actuators, lead screw and nut, rack and pinion, bearing and race, linear electromagnet, etc.). The rails may be formed as linear members or may be formed with curved and/or angled sections to provide for any direction of travel of the attachment apparatus 214. Furthermore, the drive system (not shown) of frame 216 may be assigned to a single rail with additional rails used to restrain motion along particular directions. For example, the frame 216 may include a drive motor (e.g., such as motor 210 or the like) directly connected to a lower horizontal rail and then coupled to an upper horizontal rail via a coupling shaft, wherein the upper horizontal rail is a stabilizing rail without a respective drive system attached thereto. Although described herein with reference to a slider 218, the present disclosure contemplates that any suitable mechanism for facilitating motion of the attachment apparatus 214 may be used. By way of example, movement of the attachment apparatus 214 (e.g., a rotary motion) may be caused or driven by a stepper motor coupled with the attachment apparatus 214.

Similarly, in some embodiments, a slider 218 configured for use with the attachment apparatus 214 may also be supported by a vertical rail configured to facilitate linear motion of the slider 218 and/or attachment apparatus 214 in a vertical direction of travel. Translation of the slider 218 and/or the attachment apparatus 214 along the vertical rail may also be caused by a drive system (e.g., belt, chain, servo motors, linear and/or rotary actuators, linear electromagnet, etc.). The vertical rail and/or horizontal rail may be formed as a linear member or may be formed with curved and/or angled sections to provide for any direction of travel of the slider 218 and/or attachment apparatus 214.

Although illustrated in FIG. 2B as an example vacuum plunger, the attachment apparatus 214 may include any engagement feature (e.g., hooks, claws, magnets, suction hoses, suction cups, adhesive substances, clips, fixed or retractable loops, ropes, wires, chains, and/or the like) configured to interact with one or more food items. Furthermore, the retrieval arm 212 may be formed, at least partially, as a flexible structure (e.g., of rubber, silicon, plastic, spring steel, and/or the like) or as a rigid structure (e.g., hardened steel, hardened aluminum, and/or the like) based upon the intended application of the automated food coating system 100. In some embodiments, the retrieval arm 212 may include one or more sensors (not shown) for determining the relative position of the retrieval arm 212 and/or the attachment apparatus 214 within one or more subsystem housings of the automated food coating system 100. In some embodiments, the attachment apparatus 214 may be configured to rotate, such as by the frame 216 as described above (e.g., via one or more air cylinders, drive motors, pneumatic elements, hydraulic elements, or the like), to scoop one or more food items into a rotatable basket embodiment of the attachment apparatus 214.

With reference to FIG. 3, an example second subsystem 102 (e.g., an automated breading subsystem) of the automated food coating system 100 is illustrated. Although described herein with reference to a breading operation of the second subsystem 102, the present disclosure contemplates that the second subsystem 102 may be configured to coat the surface of a food item with any other food item, material, or the like (e.g., the second subsystem is not limited to breading operations). The example second subsystem 102 may include a second coating material reservoir 302. In some embodiments, the second coating material reservoir 302 may, at least partially, be configured as a housing for the second subsystem 102 such that the second coating material reservoir 302 supports one or more components of the second subsystem 102. The second coating material reservoir 302 may be at least partially filled with a second coating material (e.g., breadcrumbs, seasoning, and/or the like). The second coating material reservoir 302 may include a motor 304 (e.g., stepper motor, servo motor, etc.) that is configured to cause continuous and/or discrete, incremental movements of the second coating material reservoir 302. Rotation of the second coating material reservoir 302, via at least motor 304, along a clockwise and/or counterclockwise rotational axis A may be caused by a drive system (e.g., rollers, belt, chain, servos, linear and/or rotary actuators, lead screw and nut, rack and pinion, bearing and race, linear electromagnet, etc.).

As shown in FIG. 3, the second subsystem 102 may be configured to receive one or more first food items from, for example, the first subsystem 101 via the transfer opening, such as transfer opening 208 of FIG. 2A-B, at a transfer surface 306 (e.g., the position in the second subsystem 102 at which food items are received from the first subsystem 101). In some embodiments, the transfer surface 306 may comprise a bottom surface of the second coating material reservoir 302. The bottom of the second coating material reservoir 302 may be, for example, substantially covered with a second coating material (e.g., breadcrumbs or the like) piled up to a determined depth, in which case the transfer surface 306 may refer to the upper or exposed surface of the piled second coating material. In some embodiments, the second subsystem 102 may include a coating material distribution plow 314 configured to distribute the one or more second coating materials during rotational operation with respect to the transfer surface 306.

For example, the coating material distribution plow 314 may be configured to distribute breadcrumbs across the transfer surface 306 to cover transfer surface 306. In some embodiments, the coating material distribution plow 314 may distribute the one or more coating materials such that the surface profile of the one or more coating materials within the coating material reservoir 302 is substantially uniform (e.g., within applicable tolerances). Additional mechanisms for the distribution of the one or more second coating materials may be contemplated. For example, the distribution of the one or more coating materials may also be effectuated, at least in part, by mechanical perturbations (e.g., shaking, wobbling, vibrations, pulsations, etc.) from the motor 304, the speed of rotation of the second coating material reservoir 302 (i.e., due to centrifugal force), or any other suitable method for the distribution of the one or more second coating materials. Although described herein with reference to a coating material distribution plow 314, the present disclosure contemplates that the second subsystem 102 may include any mechanism for redistributing the coating materials supported by the coating material reservoir 302, such as in response to modification of a substantially uniform surface profile by, for example, the body of the flow tumbler 308 described hereafter.

The second subsystem 102 may further include a flow tumbler 308. The flow tumbler 308 may include a body defining a first end 308A and a second end 308B. In some embodiments, the second end 308B may be opposite the first end 308A such that a food item may enter the flow tumbler 308 at the first end 308A and exit the flow tumbler 308 at the second end 308B. In some embodiments, the body of the flow tumbler 308 may define a semicircular or arcuate shape.

The body of the flow tumbler 308 may further define a flow channel 309. The flow channel 309 may be defined by an inner surface (e.g., collectively defined by inner sidewalls 308C and 308D) of the body of the flow tumbler 308 which extends between the first end 308A and the second end 308B. In some embodiments, the flow channel 309 may be configured to redirect the breading (e.g., second coating material supported by reservoir 302) as described herein (e.g., via swooped and/or funneled sidewalls of the flow tumbler 308). The body of the flow tumbler 308, which defines the flow channel 309 may further define one or more inner sidewalls 308C and 308D. In some embodiments, the one or more inner sidewalls 308C and 308D may define at least one concave surface. In some embodiments, the one or more inner sidewalls 308C and 308D may define a pair of converging concave surfaces. The one or more converging concave shaped inner sidewalls 308C, 308D may collectively distribute the coating material about the first food item within the flow channel 309. In some embodiments, the one or more inner sidewalls may further be defined by curved, angled, ridged, spiraled, etc. geometries and/or patterns defined by or disposed upon the one or more inner sidewalls 308C, 308D. Such geometries and/or patterns may assist with the distribution of the one or more coating materials upon the first food item.

Each portion of the flow channel 309 may have an associated cross-sectional area which is based at least in part on a distance between the one or more inner sidewalls 308C and 308D. In some embodiments, the cross-sectional area of the flow channel 309 may narrow from the first end 308A to the second end 308B. As such, the flow channel 309 of the flow tumbler 308 may define a shape that tapers from the first end 308A to the second end 308B. In some embodiments, the narrowed cross-sectional area of the flow channel 309 at the second end 308B may be configured to reorient a first food item from a first orientation as received at the first end 308A to a second orientation at the second end 308B prior to the first food item exiting the flow tumbler 308.

The body of the flow tumbler 308 may further define an outer surface (see 308E in FIG. 4A). The outer surface 308E may be opposite the inner surface collectively defined by inner sidewalls 308C and 308D. The outer surface 308E may further define an attachment mechanism configured to suspend the body of the flow tumbler 308 above the coating material reservoir 302. In some embodiments, the attachment mechanism may be configured to attach the flow tumbler 308 to the frame 216. In operation, the second coating material reservoir 302 may rotate about an axis A such that the second coating material supported therein is similarly rotated relative the flow tumbler 308. The flow tumbler 308 may be a suspended fixed member relative the second coating material reservoir 302.

The flow tumbler 308 may be configured to receive a plurality of food items at a first end 308A and cause a mixing of the plurality of food items during movement through the flow tumbler 308 by a rotational movement of the second coating material reservoir 302. For example, a chicken breast (e.g., first food item) may be placed in the second coating material reservoir 302 such that the chicken breast is at least partially supported by the coating material. The chicken breast may enter the flow tumbler 308, via first end 308A, with a plurality of breadcrumbs (e.g., second coating material) due to rotation of the second coating material reservoir 302 about axis A. In such an example, as the chicken and breading flow through the flow tumbler 308, the breading may be forced, by the profile of the flow tumbler 308 (i.e., via the flow channel 309), to cover one or more of the top, bottom, and/or sides of the chicken breast. According to such an example, the chicken breast exits the flow tumbler 308 via a second end 308B substantially covered in breading (e.g., second coating material). Said differently, the geometry (e.g., curved, angled, ridged, spiraled, etc.) of the flow channel 309 may be configured to cause mixing of the first food item and the second coating material. In some embodiments, the flow tumbler 308 may be configured with an interior grate configured to force a first food item (e.g., chicken breast, etc.) below a second coating material (e.g., breadcrumbs, etc.) while allowing the second coating material (e.g., breading) to flow over the grate and thus over the top and sides of the first food item (e.g., chicken breast). Example embodiments of the flow tumbler 308 are described hereafter with respect to FIGS. 4A-4D.

In order to facilitate distribution of the second coating material (e.g., breading) about the first food item (e.g., chicken breast), the second end 308B of the flow tumbler 308 may be configured to define a surface profile of the second coating material proximate the second end 308B. As described herein, the second coating material reservoir 302 may support the second coating material having a substantially uniform surface profile (e.g., a substantially even depth of second coating material). As the second coating material reservoir 302 is rotated about the axis A, the second end 308B may modify this substantially uniform surface profile by, for example, defining a groove, trench, recess, etc. within the second coating material within which the first food item may be positioned. Said differently, the second end 308B of the flow tumbler 308 may form a location within the second coating material in which the chicken breast may be located such that at least a portion of the chicken breast (e.g., first food item) is beneath the substantially uniform surface profile of the remaining second coating material.

The inner surface of the body of the flow tumbler 308 may further be configured such that a first cross-sectional area of the flow channel 309 at the first end 308A is larger than a second cross-sectional area of the flow channel 309 at the second end 308B. In other words, a cross-sectional area of the flow channel 309 may narrow from the first end 308A to the second end 308B. This reduction in cross-sectional area of the flow tumbler 308 in the direction in which the food item is moved through the flow tumbler 308 may be such that the second coating material that is collectively redirected by the flow channel 309 (e.g., contacts the inner sidewalls 308C, 308D and is directed along the side walls 308C, 308D) converges and at least partially accumulates due to the narrowing cross-sectional area resulting in improved coating of the food item. In other words, the amount of coating material that is redirected by the flow tumbler 308 proximate the first end 308A may be greater than the amount of coating material that may move within the flow channel 309 at the second end 308B such that the top of the food item may be substantially covered by the second coating material.

The second subsystem 102, as shown in FIG. 3, may also include a compression device 310. In some embodiments, the compression device 310 may define a pressing surface 310A configured to interact with the one or more first food items moved by the rotation of the second coating material reservoir 302. The pressing surface 310A may be associated with a cross-sectional area that may be dimensioned (e.g., sized and shaped) based at least in part on the cross-sectional area of the one or more first food items. In some embodiments, the cross-sectional area of the pressing surface 310A of the compression device 310 may be substantially the same as the cross-sectional area of the one or more first food items. In some embodiments, the cross-sectional area of the pressing surface 310A of the compression device 310 may be larger than the cross-sectional area of the one or more first food items. In some embodiments, the pressing surface 310A of the compression device 310 may be circular; however, any other suitable pressing surface shape may also be contemplated.

In some embodiments, the compression device 310 may be suspended above the second coating material reservoir 302, such as via attachment between the compression device 310 and the frame 216. The compression device 310 may also be configured to move between two or more configurations (e.g., via one or more air cylinders, drive motors, pneumatic elements, hydraulic elements, or the like). In some embodiments, the compression device 310 may be configured to move between an extended configuration and a retracted configuration. The extended configuration may be defined as a configuration in which the pressing surface 310A of the compression device 310 at least partially contacts the one or more first food items (e.g., chicken breasts). As shown, the one or more first food items may refer to food items which have exited the flow tumbler 308 via the second end 308B. The retracted configuration may be defined as a configuration in which contact between the pressing surface 310A and the first food item is precluded. For example, the retracted configuration may raise the compression device 310 above the coating material reservoir 302 such that the compression device 310 does not contact the one or more first food items.

While in the retracted position, the compression device 310 may be raised, such as by the frame 216 such that the compression device 310 is above the position of the first food item and/or the second coating material. As the second coating material reservoir 302 rotates with the compression device 310 in the retracted position, one or more first food items may be moved, by the rotational movement of the second coating material reservoir 302, to be positioned below the compression device 310. With the one or more food items positioned below compression device 310, the second subsystem 102 may be configured to lower the compression device 310 to the extended configuration and at least partially contact the one or more food items and, in some embodiments, further compress the one or more first food items. For example, a chicken breast may be covered in breading after the exiting flow tumbler 308 and may then be positioned beneath the compression device 310. The compression device 310 may be lowered into the extended position and apply a determined amount of force to compress the breading at least partially into an exterior surface of the chicken breast. Although described herein with reference to a compression device 310 (e.g., a pressing surface having a circular shape), the present disclosure contemplates that the compression device 310 may similarly refer to a pressing surface having any dimensions (e.g., size or shape) depending upon the intended application of the second subsystem 102. Additionally, the present disclosure contemplates that the functionality of the compression device 310 may be similarly provided by other pressing mechanisms such as, for example, one or more rollers.

As shown in FIG. 3, the second subsystem 102 may further include an item retrieval lift 312. In some embodiments, the item retrieval lift 312 may be suspended above the second coating material reservoir 302. For example, the item retrieval lift 312 may be attached to the frame 216. The item retrieval lift 312 may be configured to receive one or more food items while in a first position and move to a second position while retaining the one or more received food items. Additionally, the item retrieval lift 312 may be configured to move from the second position to a third position and release the one or more food items at the third position. In some embodiments, item retrieval lift 312 may comprise one or more of a rotatable basket, a shelf, a prong, a shovel, a grate, and/or the like. As depicted in FIG. 3, item retrieval lift 312 may define a pronged fork. In some embodiments, the item retrieval lift 312 may be configured with the frame 216 to move horizontally and/or vertically relative to one or more surfaces of the second subsystem 102.

For example, the rotation of the second coating material reservoir 302 may move a coated chicken breast onto a portion of the item retrieval lift 312 in a first position at least partially within the second coating material reservoir 302. In such an example, the item retrieval lift 312 may be configured, via the prongs, to retain the chicken breast while allowing excess breading to fall from the chicken breast into the second coating material reservoir 302 upon movement of the item retrieval lift 312. According to this example, the item retrieval lift 312 may move to a second position vertically above the second coating material reservoir 302 while retaining the coated chicken breast. The item retrieval lift 312 may subsequently move to a third position above, for example, a third subsystem 103. While in the example third position, the item retrieval lift 312 may be configured to release the coated chicken breast to one or more components to the third subsystem 103. In such an embodiment, the item retrieval lift 312 may be configured, via the frame 216 (e.g., actuated by one or more air cylinders, drive motors, pneumatic elements, hydraulic elements, or the like), to return to the first position to receive another one or more food items to be removed from the second subsystem 102 and deposited in the third subsystem 103.

In some embodiments, the item retrieval lift 312 may be configured as a rotatable basket with grates on one or more sides of the basket and, with the frame 216, may be further configured to raise (e.g., via one or more air cylinders, drive motors, pneumatic elements, hydraulic elements, or the like) above the second coating material reservoir 302 while holding one or more food items and deposit the one or more food items into another food item reservoir by rotating above the second coating material reservoir 302 at a determined angle and speed. In some embodiments, the coating material distribution plow 314, the compression device 310, the item retrieval lift 312, and/or the flow tumbler 308 may be supported at least partially by the frame 216. Additionally, the frame 216 may include one or more drive systems (e.g., via one or more air cylinders, motors, pneumatic elements, hydraulic elements, or the like) for operating the coating material distribution plow 314, the compression device 310, the item retrieval lift 312, and/or the flow tumbler 308.

With reference to FIGS. 4A-4D, further views of an example flow tumbler 308 are provided. As shown, the example flow tumbler 308 may define a first end 308A and a second end 308B opposite the first end. The outer surface 308E of flow tumbler 308 is also shown. As shown in FIG. 4A, the flow tumbler 308 may be at least partially supported by the frame 216 comprising a plurality of vertical/horizontal rails, coupling brackets, wire harness, and/or hardware fixtures. The flow tumbler 308 may be attached to the frame 216 with an attachment mechanism defined by the outer surface 308E. As shown the flow tumbler 308 may define an arcuate or semicircular shape. In some embodiments, the flow tumbler 308 may instead define a conical shape, a rectangular shape, and/or the like so long as food items may travel therethrough as described herein.

FIG. 4B illustrates an example interior view of the example flow tumbler 308. As shown, the inner surface (e.g., collectively formed by inner sidewalls 308C and 308D) of the body of the flow tumbler 308 may be configured to funnel a coating material (e.g., breading) about a food item as the food item is moved through the flow tumbler 308. In some embodiments, the food item may enter the flow tumbler 308 at the first end 308A in a first configuration and exit the flow tumbler 308 at the second end 308B in a second configuration. The second configuration for the one or more food items may be based at least in part on the cross-sectional area of the flow channel 309 at and/or near the second end 308B. For example, a food item 401 as shown in FIG. 4B may enter the flow channel 309 in a first configuration and may be forced in part by the geometry of flow tumbler 308 to, for example, rotate as it travels through flow tumbler 308 to the second end 308B, where the food item 401 then exits in a second configuration. In this way, the flow tumbler 308 may further operate to orient the food items received therein.

FIG. 4C illustrates a profile view of an example inner surface of the flow tumbler 308 which defines a flow channel 309 as viewed from a first end 308A of the flow tumbler 308. As shown, the example inner surface may define curved inner sidewalls 308C, 308D configured to push, distribute, or otherwise move a plurality of second coating material (e.g., breadcrumbs, seasoning, etc.) up and into the center of the flow channel 309 of the flow tumbler 308. For example, breading may be forced by the flow tumbler 308's sidewall geometry to, as the breading moves through the flow tumbler 308, pile into the center of the flow channel 309. In such an embodiment, the breading may be forced onto and around a chicken breast passing therethrough.

FIG. 4D illustrates a profile view of an example inner surface of the flow tumbler 308 which defines a flow channel 309 as viewed from a second end 308B of the flow tumbler 308. As shown, the example inner surface of the flow tumbler 308 defines at least partially curved inner sidewalls configured to push, distribute, restrict, or otherwise control, the flow of a plurality of coating material (e.g., breadcrumbs, etc.) as they exit the flow tumbler 308. In some embodiments, the inner surface and/or the cross-sectional area of the flow channel 309 at and/or near the second end 308B may define a circle, oval, rectangle, semi-circle, etc. shaped opening such that the food items within the flow tumbler 308 may exit. In some embodiments, the sidewall geometry at and/or near the first end 308A may be configured to curve along the length of the inner surface of the flow tumbler 308 and conform to the sidewall geometry defined at and/or near the second end 308B.

With reference to FIG. 5, an example third subsystem 103 (e.g., the automated food receptacle subsystem) of the automated food coating system 100 is illustrated. The example third subsystem 103 may include a third food item reservoir 502. In some embodiments, the third food item reservoir 502 may be configured as a housing for the third subsystem 103. In some embodiments, the third food item reservoir 502 may be at least partially pre-filled with one or more coating materials (e.g., breadcrumbs, seasoning, the like, or combinations thereof). As shown in FIG. 5, the third subsystem 103 may be configured to receive one or more food items from, for example, the second subsystem 102 via the item retrieval lift 312. For example, a chicken breast may be dipped in a milk wash by the first subsystem 101, then transferred to the second subsystem 102 where the chicken breast is breaded, and then deposited in the third subsystem 103 for storage until the chicken breast is cooked (e.g., fried in cooking oil or the like). In some embodiments, the third subsystem 103 may comprise a frying basket configured to receive coated food items (e.g., breaded chicken breasts, breaded chicken tenders, etc.), and, upon receipt of the one or more coated food items, the frying basket may submerge the food items in heated cooking oil. In other embodiments, the third subsystem 103 may comprise a refrigeration unit to, for example, keep coated food items at a safe food storage temperature (e.g., 40 degrees Fahrenheit or the like).

As shown, the third subsystem 103 may further include an extraction arm 508 that comprises an extruder 506 and one or more prongs 504 for facilitating removal of food items of the item retrieval lift 312. For example, the extraction arm 508 may be configured to move when one or more prongs 504 interface with the item retrieval lift 312. As the item retrieval lift 312 moves into a position over the third subsystem 103, one or more features of the item retrieval lift 312 may interface with one or more of the prongs 504. Additionally, for example, as the item retrieval lift 312 continues to move, the one or more prongs 504 may push, pull, or otherwise manipulate one or more food products transported by the item retrieval lift 312 such that the one or more food products are removed from the item retrieval lift 312 and deposited into the third food item reservoir 502. In some embodiments, the extraction arm 508 may be configured to move independent of an interface with the item retrieval lift 312, for example, by being configured with one or more drive systems controlled and/or supported at least by the frame 216.

In some embodiments, one or more food item reservoirs and/or coating material reservoirs may include one or more fill sensors (e.g., weight sensors, image sensors, etc.) that are further configured with software and sensor circuitry to provide an indication (e.g., a light, vibration, sound, and/or the like) to one or more operators (e.g., staff members) that the respective food item reservoir(s) have reached a defined fill limit (e.g., empty, partially filled, completely full, over filled, etc.). For example, when the third food item reservoir 502 of the third subsystem 103 is full of coated food items, the automated food coating system 100 may sound an alarm to indicate to staff members that the third food item reservoir 502 needs to be emptied or replaced with another empty reservoir. By way of an additional example, when the first food item reservoir 202 is emptied of all first food items (e.g., chicken breasts) by the first subsystem 101, the automated food coating system may detect this condition, via one or more fill sensors, and flash a light to alert staff members that the automated food coating system 100 needs to be re-filled with additional first food items.

With reference to FIG. 6, an example rotatable basket 700 is illustrated for use with some embodiments of the system 100. In some embodiments of the automated food coating system 100, one or more of the retrieval arm 212, the attachment apparatus 214, the extraction arm 508, the item retrieval lift 312, or the like may be replaced with a rotatable basket 700. For example, the rotatable basket 700 may replace the extraction arm 508 and the item retrieval lift 312, in one or more embodiments described above. In operation, the rotatable basket may scoop one or more coated first food items from the second coating material reservoir 302. As the basket 700 rotates, the grate openings 702 allow excess of the coating material to be returned to reservoir 302. When the rotatable basket 700 rotates beyond, for example, 90 degrees from the scooping point, gravity causes the coated first food item to fall on a ramped surface 704, initially positioned over the coated first food item during the scooping operation. Once the coated first food item contacts the ramped surface 704, the first food item is ejected into the third food item reservoir 502.

Example Movement Operations

With reference to FIG. 10, a flow chart depicting a movement operation cycle 1000 (e.g., cycle 1000) of the automated food coating system 100 of FIG. 1 is illustrated. The method steps described herein should not be read to restrict movement to a single coordinate system (e.g., cartesian, polar, etc.) or type of direction of movement (e.g., linear, rotational, circular, arcing, horizontal, vertical, diagonal, etc.). Furthermore, the present disclosure contemplates that multiple and/or duplicative components of the system may move simultaneously during the cycle 1000. For example, the first subsystem 101, second subsystem 102, and third subsystem 103 may each be associated with a single frame 216 and/or multiple frames or associated systems. Furthermore, reference herein to operations performed by or with the frame 216 may further include operations performed by or with the assistance of one or more air cylinders, drive motors, pneumatic elements, hydraulic elements, and/or the like associated with the frame 216. Performance of the cycle 1000 of FIG. 10 is described hereafter with reference to the elements in FIGS. 7A-J, 8A-8H, and 9A-E detailing the first subsystem 101, second subsystem 102, and third subsystem 103, respectively.

As described herein, the cycle 1000 of the automated food coating system 100 may engage the three subsystems 101, 102, and 103. Performance of the cycle 1000 may, in some embodiments, be initiated by a user (e.g., via a user interface 616) or may, in other embodiments, be automatically initiated (e.g., via a processor 612 or the like). During operation, the first subsystem 101 includes retrieving a first food item from a first food item reservoir 202 by a retrieval arm 212 and attachment apparatus 214 via a motor 210 of frame 216. The first food item may then be submerged in a first coating material inside a first coating material reservoir 204 via the retrieval arm 212 and attachment apparatus 214. As described above, in some embodiments, the first coating material reservoir 204 may be configured to apply a first coating material to a first food item (e.g., via a spraying system or the like). The first food item may then be placed inside a second coating material reservoir 302 via a transfer opening 208 using the retrieval arm 212 and attachment apparatus 214. In the second subsystem 102, the first food item may be funneled through a flow tumbler 308 via a first end 308A and out a second end 308B, effectively covering the first food item with the second coating material by rotating the second coating material reservoir 302 via a motor 304. A compression device 310 may combine the first food item and second coating material via compressive force. The coated first food item may then be further rotated onto an item retrieval lift 312. In the third subsystem 103, the item retrieval lift 312 containing the coated first food item may be lifted out of the coating material reservoir 302 and positioned over the third food item reservoir 502. An extruder 506 may interact with the item retrieval lift 312 such that the coated first food item is pushed, pulled, or otherwise moved from the item retrieval lift 312 and into the third food item reservoir 502.

In particular, the cycle 1000 may include a start procedure 10002, indicating the start of the automated food coating process. Procedure 1004 may include placing one or more food items into one or more respective food item reservoirs. In some embodiments, the amount of food items and/or coating material in the respective reservoirs is indicated by a fill sensor configured to provide an indication of the status of the fill limit (e.g., empty, partially filled, completely filled, over filled, etc.). In some embodiments wherein the fill limit is considered satisfactory, this step is not performed. Placement of the food items in the respective reservoirs may, in some instances, be completed by a human operator or actor. In other embodiments, the automated food coating system 100 may include automated devices or components configured to place food items in respective reservoirs.

Figure 7A:
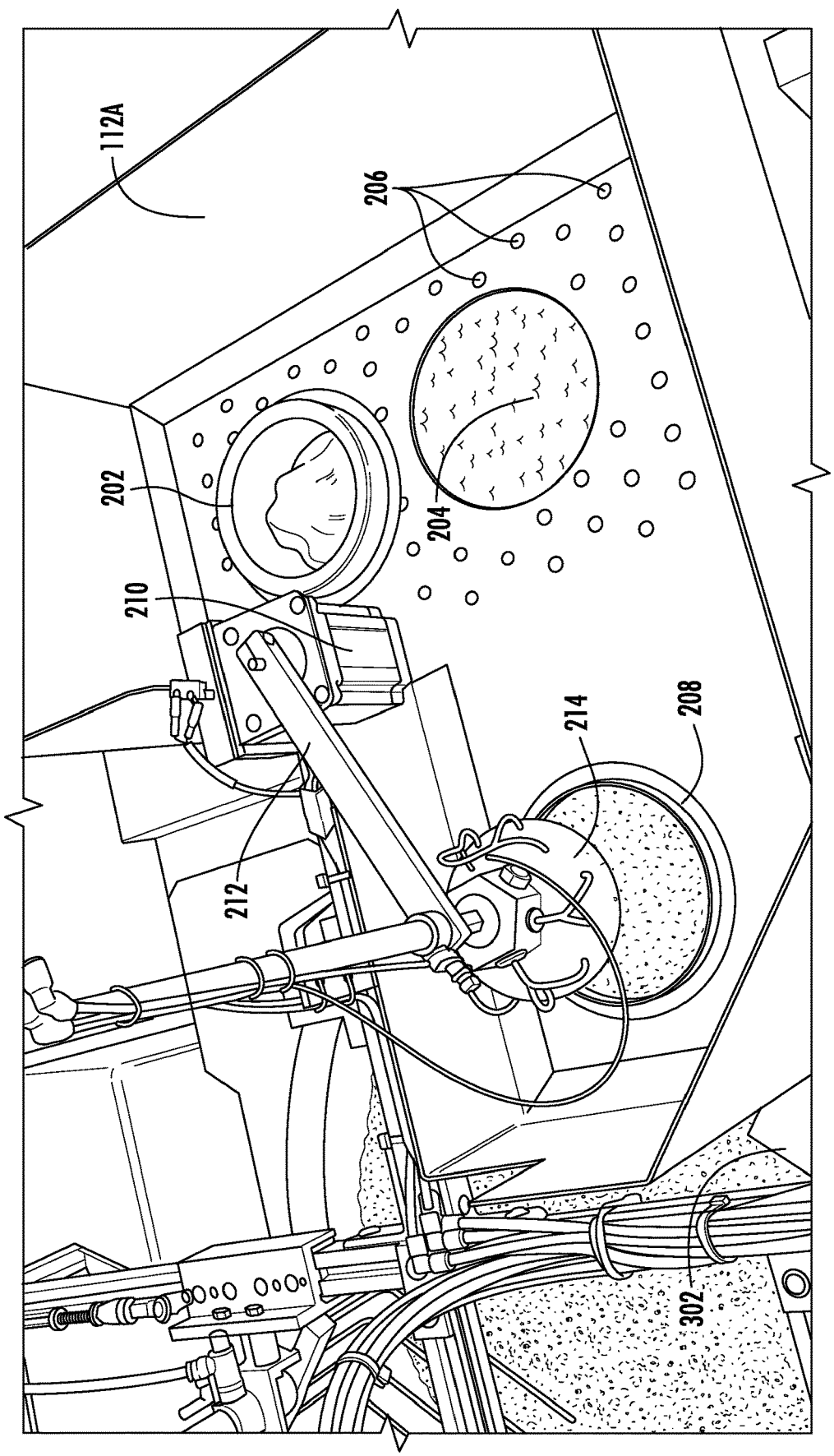

The cycle 1000 may further include operation 1006 in which at least a start cycle signal is received. In some instances, the start cycle signal may be provided by a user (e.g., via a user interface 616) or may, in some embodiments, be automatically initiated (e.g., via a processor 612). In some embodiments, the cycle 1000 may include a loading or idle position at any location along the movement path for manually or automatically receiving one or more food items therein. In some instances, the loading or idle position of the attachment apparatus 214 is above transfer opening 208 as shown in FIG. 7A in order to provide ease of access to the first food item reservoir 202 and the first coating material reservoir 204.

Figure 7B:
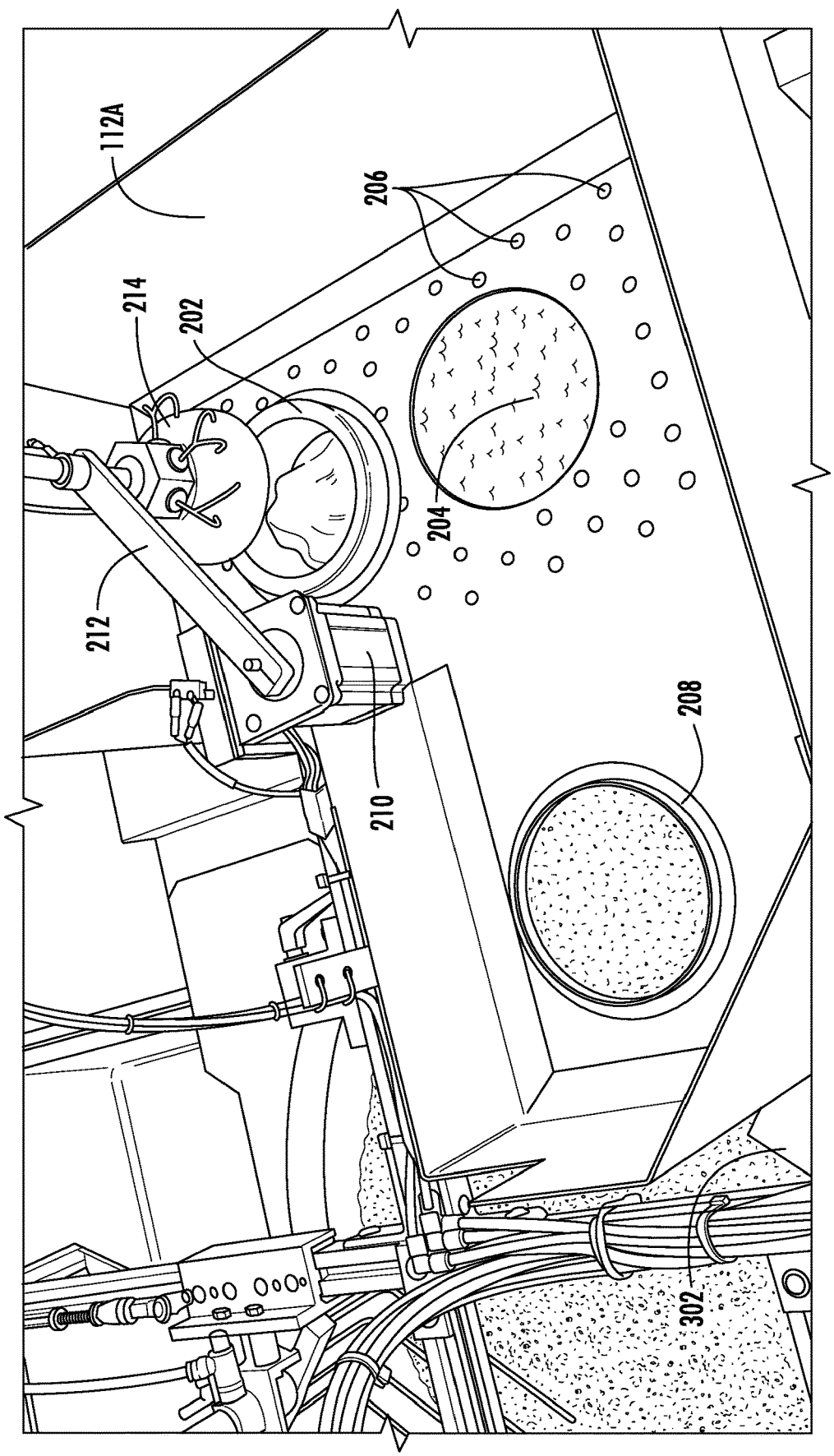

Once the one or more food items and coating materials are located within the reservoirs 202, 204, and 302, the cycle 1000 may include operation 1008 in which the attachment apparatus 214 of the retrieval arm 212 is moved to an initial position, above the first food item reservoir 202 as shown in FIG. 7B. In some embodiments, the initial position of the attachment apparatus is located vertically above the first food reservoir 202 such that the center of the attachment apparatus 214 and first food item reservoir 202 are vertically aligned. A determined vertical distance may be defined between the attachment apparatus 214 and the first food items in the first food item reservoir 202.

Figure 7C:
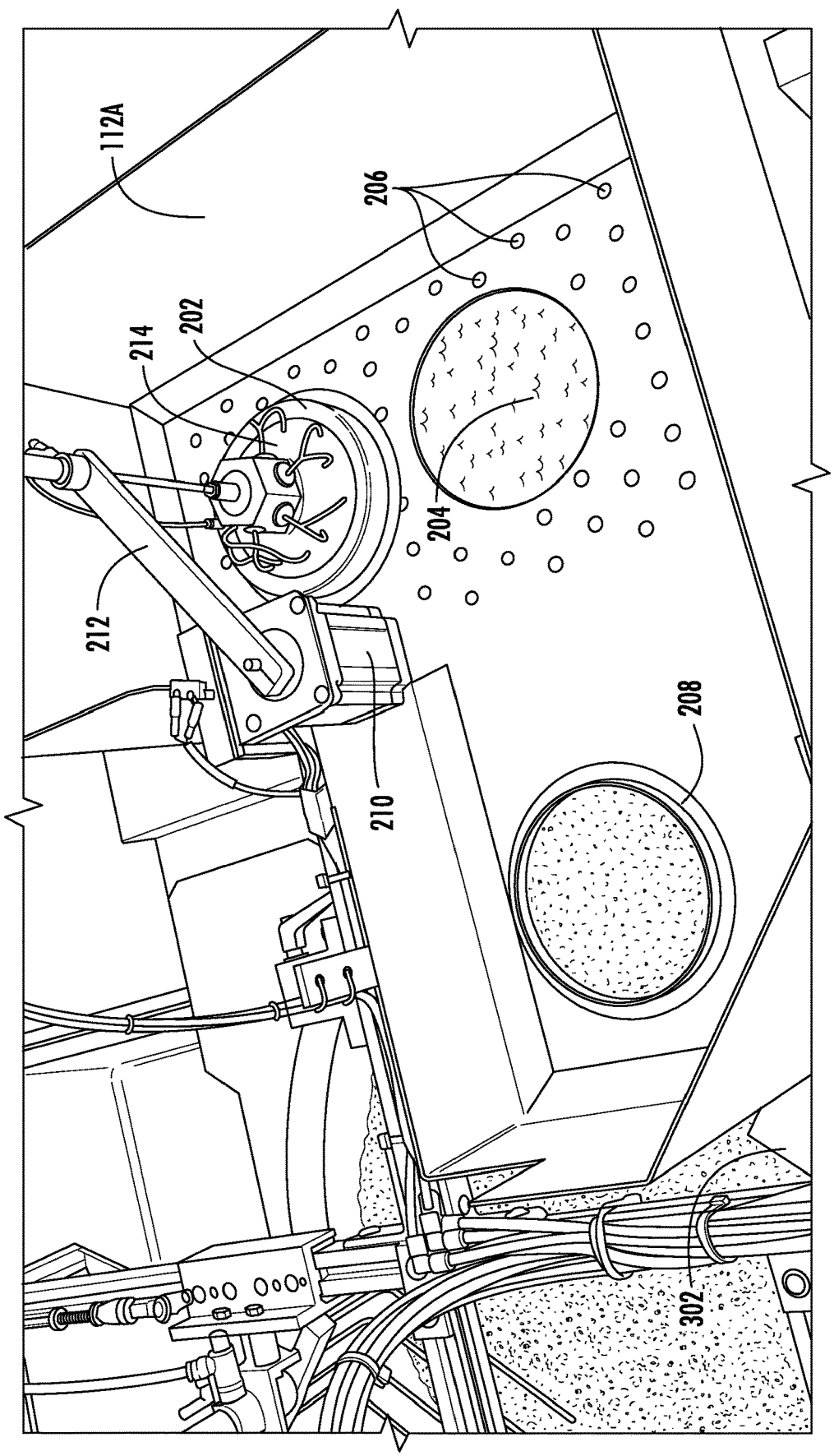
Figure 7D:
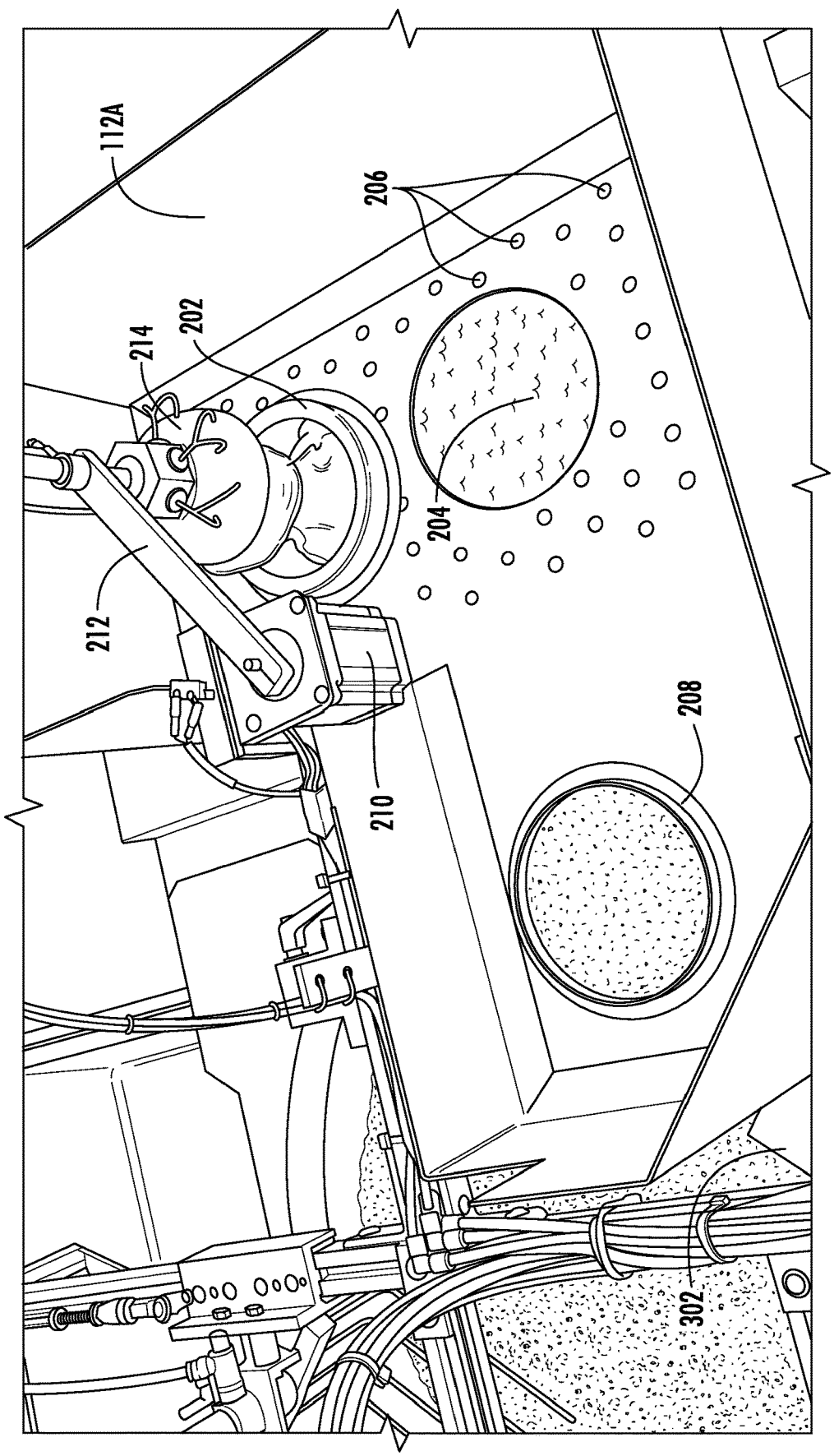

The cycle 1000 may further include operation 1010 in which a first food item is retrieved from the first food item reservoir 202. As shown in FIG. 7C, the attachment apparatus 214 may be lowered into the first food item reservoir 202. The attachment apparatus 214 may then engage with a first food item. In some embodiments, the first food item may be located via a sensor attached to the attachment apparatus 214. Once the attachment apparatus 214 has engaged with the first food item, the frame 216 may lift (e.g., move vertically) the engaged attachment apparatus 214 above the first food item reservoir 202 as shown in FIG. 7D.

Figure 7E:
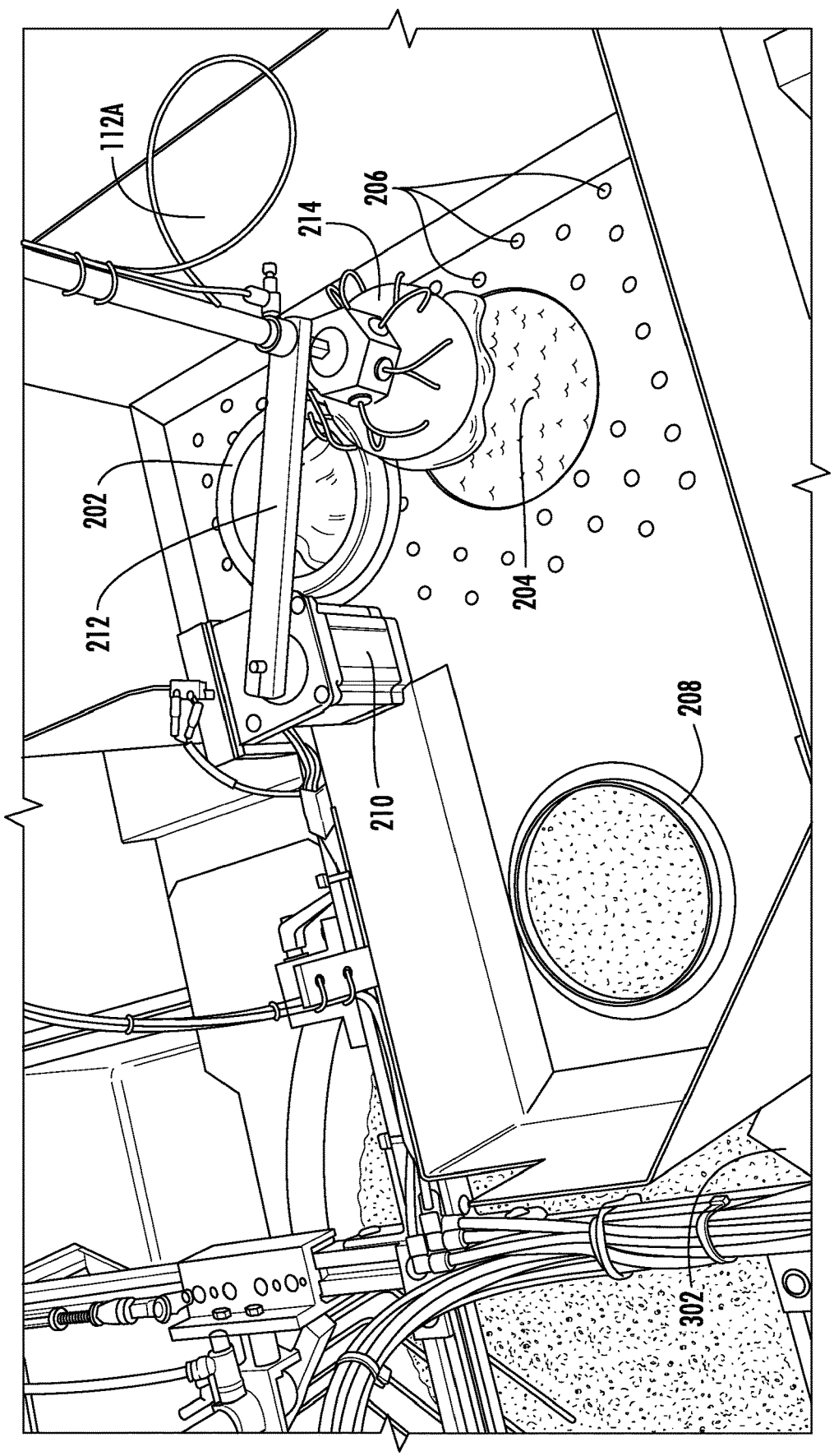

The cycle 1000 may further include operation 1012 in which the first food item is temporarily deposited in the first coating material in the first coating material reservoir 204. As shown in FIG. 7E, the engaged attachment apparatus 214 is pivoted (e.g., rotated) via the motor 210 such that the engaged attachment apparatus 214 is positioned above the first coating material reservoir 204. In some embodiments, the position of the attachment apparatus is located vertically above the second food reservoir 204 such that the center of the attachment apparatus 214 and first coating material reservoir 204 are substantially aligned. Once positioned above the first coating material reservoir 204, the frame 216 may lower the engaged attachment apparatus 214 by a defined height, such that the first food item is fully or partially submerged in the first coating material within the first coating material reservoir 204 as shown in FIG. 7F. In some embodiments, the first coating material reservoir 204 contains one or more fill sensors such that the fill amount of the first coating material in the first coating material reservoir 204 may be determined. A processor 612 may determine a distance value associated with the lowering of the engaged attachment apparatus based on the fill level of the first coating material in the first coating material reservoir 204 as determined by the one or more fill sensors.

The cycle 1000 may further include operation 1014 in which the first food item is soaked in the first coating material in the first coating material reservoir 204 for a determined amount of time. Once the soaking is complete, the frame 216 may lift (e.g., move vertically) the engaged attachment apparatus 214 above the first coating material reservoir 204 as shown in FIG. 7G. In some embodiments, the attachment apparatus may pause in this position for an amount of time to allow the excess first coating material to drip from the first food item. Otherwise, the drain holes 206 may be configured to allow spilled fluids to drain from the housing 112A as described above.

Figure 7H:
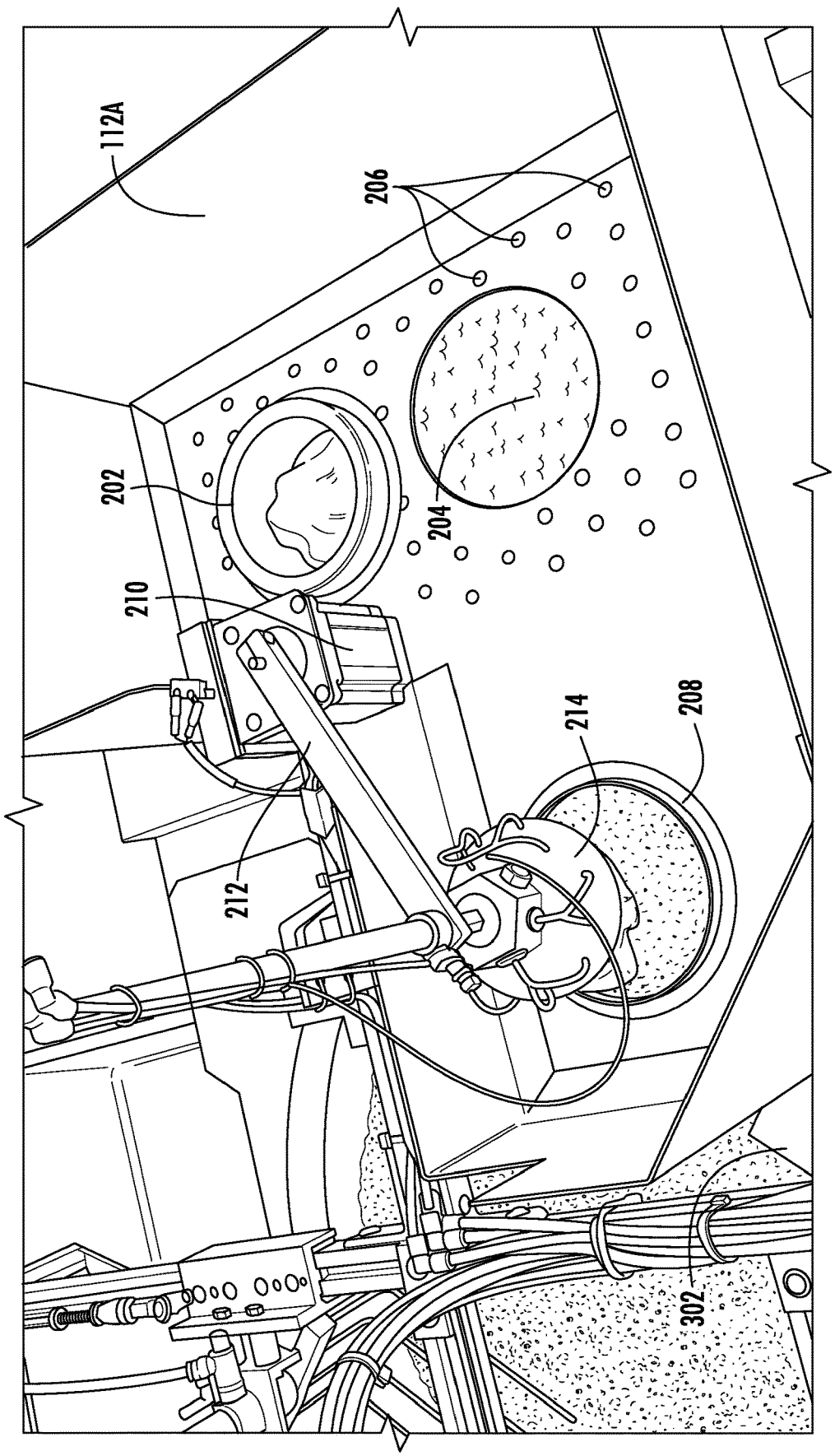
Figure 7J:
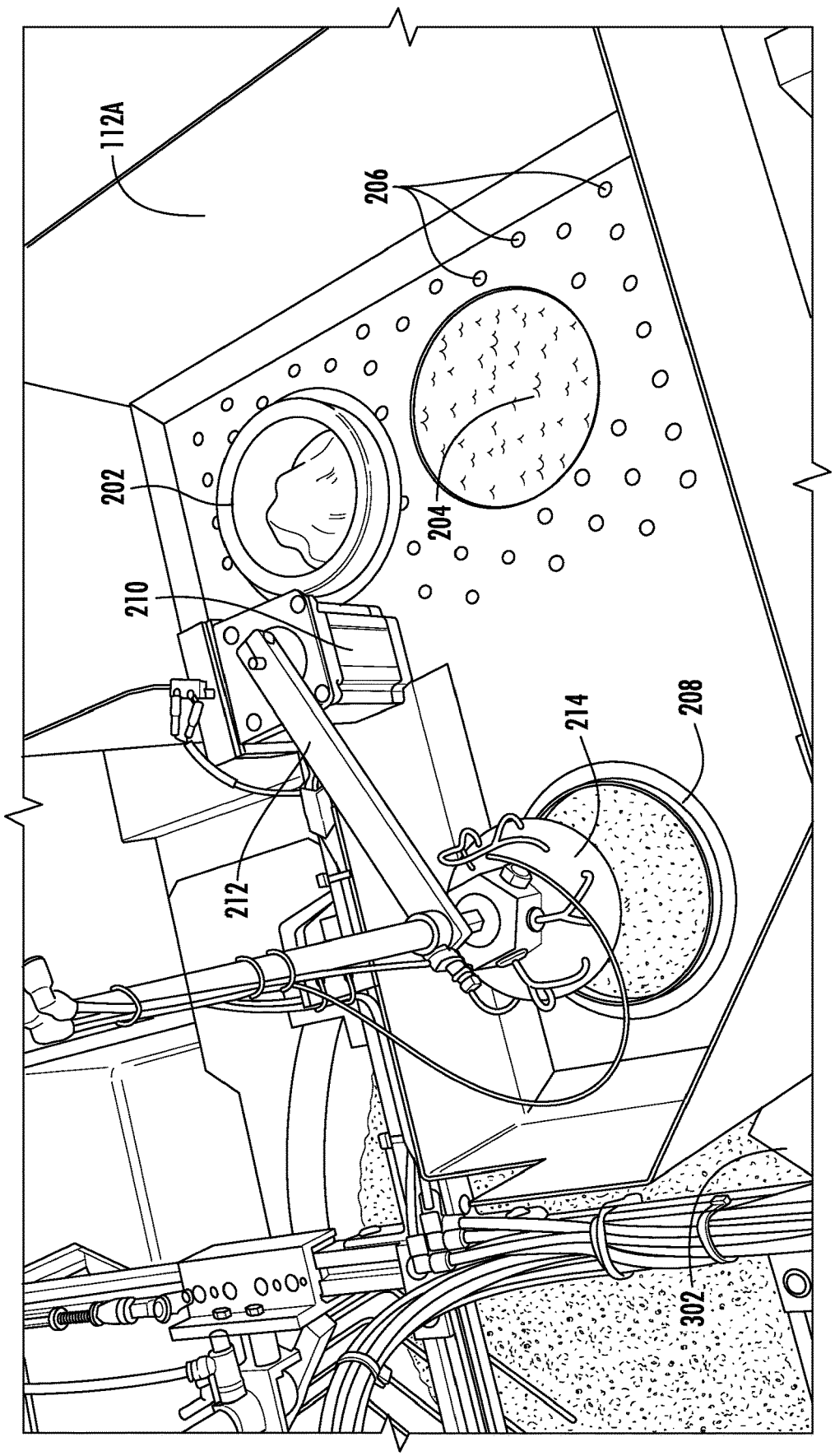

Following the soaking of the first food item in the first coating material, the cycle 1000 may further include operation 1016 in which the first food item is deposited into a second coating material reservoir 302 containing a second coating material. As shown in FIG. 7H, the engaged attachment apparatus 214 is pivoted (e.g., rotated) via the motor 210 such that the engaged attachment apparatus 214 is positioned above the transfer opening 208. In some embodiments, the position of the attachment apparatus is located vertically above the transfer opening 208 such that the center of the attachment apparatus 214 and transfer opening 208 are substantially aligned. Once positioned above the transfer opening 208, the frame 216 may lower the engaged attachment apparatus 214 by a defined height, such that the first food item is fully or partially immersed in the second coating material within the second coating material reservoir 302 as shown in FIG. 7I. Once the first food item is deposited in the second coating material reservoir 302, the attachment apparatus 214 may be lifted via the frame 216 such that it is positioned about the transfer opening 208 as shown in FIG. 7J. In some embodiments, this position is determined to be the loading or idle positioned as initially shown in FIG. 7A. The attachment apparatus may remain in this position until cycle 1000 receives the start cycle signal as detailed in operation 1006. The operations associated with the first subsystem 101 may occur in parallel to the operations described hereafter with reference to the second subsystem 102 and/or the third subsystem 103 (e.g., a continuously operating system).

Figure 8A:
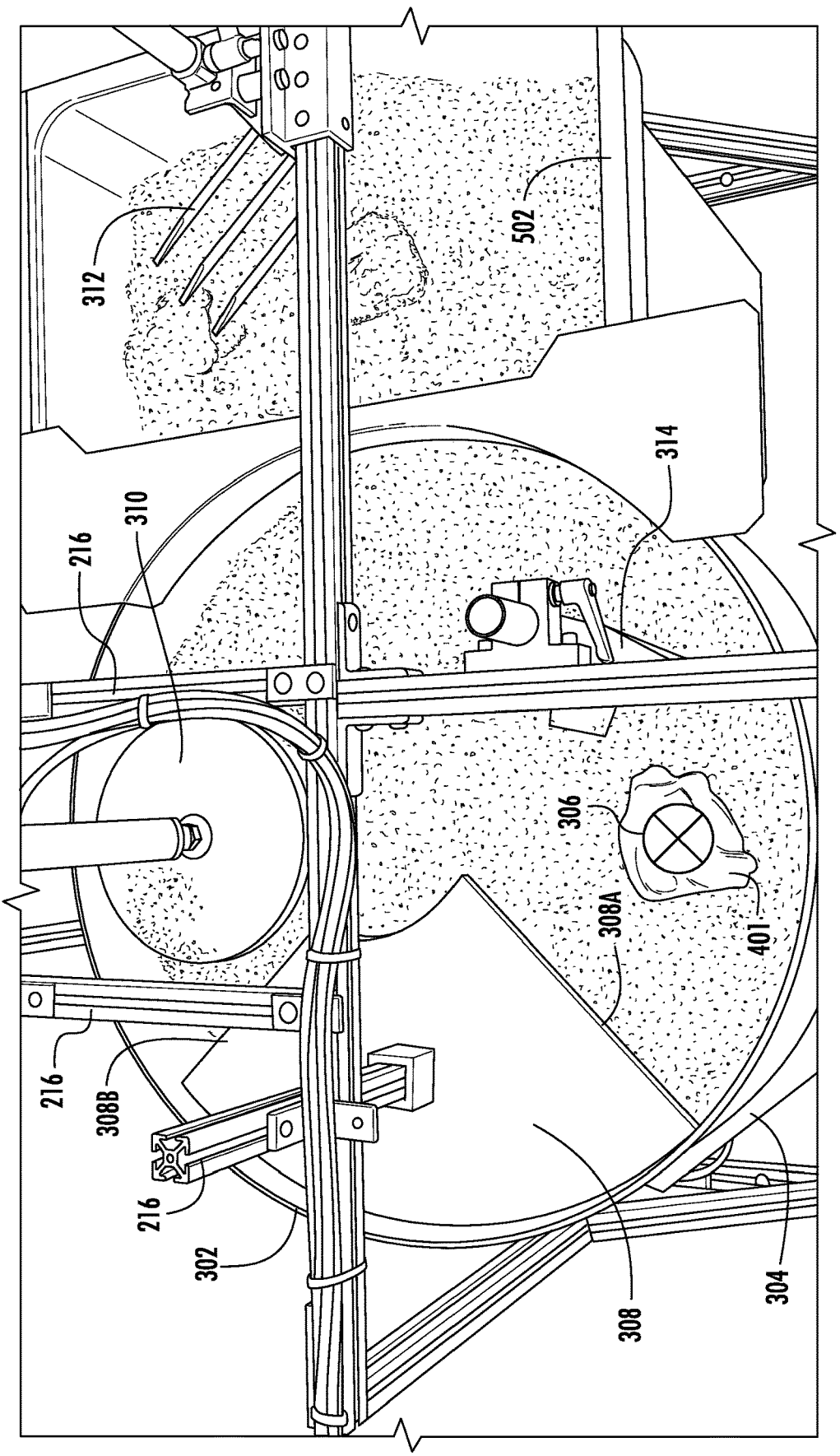
Figure 8B:
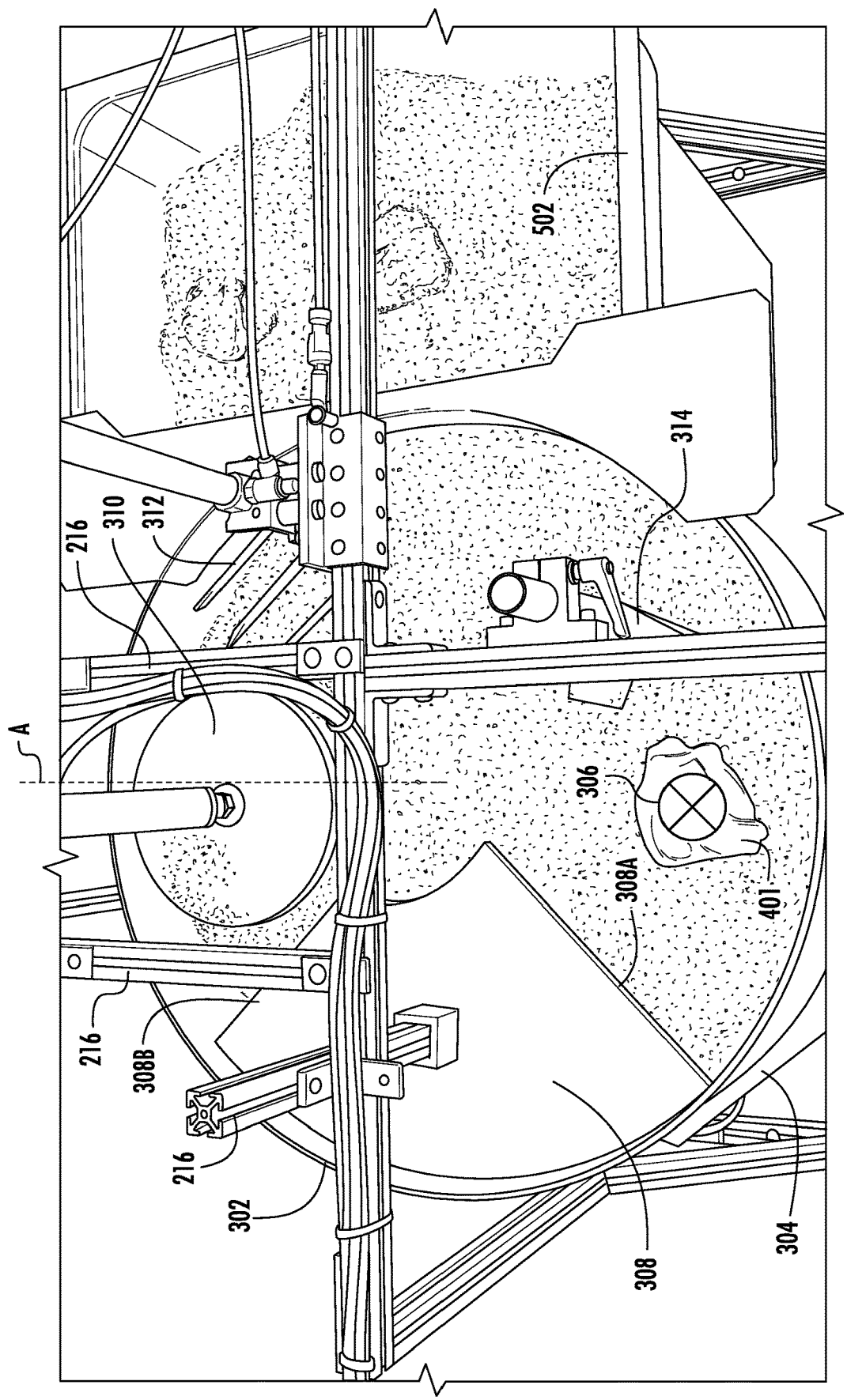

With reference to FIGS. 8A-8H, performance of the cycle 1000 is further described with reference to the second subsystem 102. After depositing the first food item, (e.g., first food item 401) into the coating material reservoir 302, the first food item may be at least partially covered in the coating material at a transfer surface 306 as shown in FIG. 8A. Prior to performing rotation operations, the item retrieval lift 312 may be moved from a position above the third food item reservoir 502 to a position above the second coating material reservoir 302 in preparation for receiving the first food item as shown in FIG. 8B.

Figure 8D:
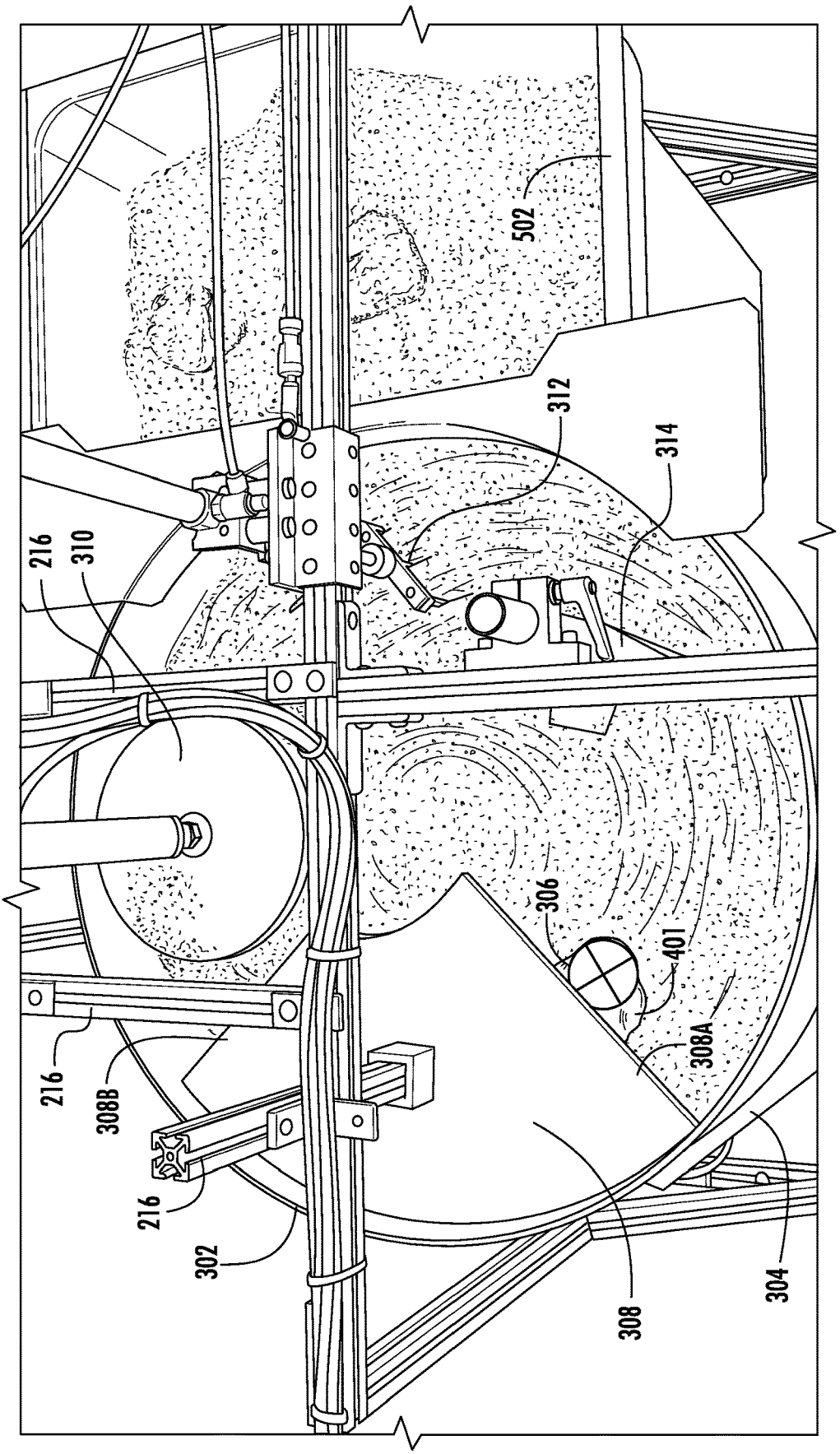
Figure 8F:
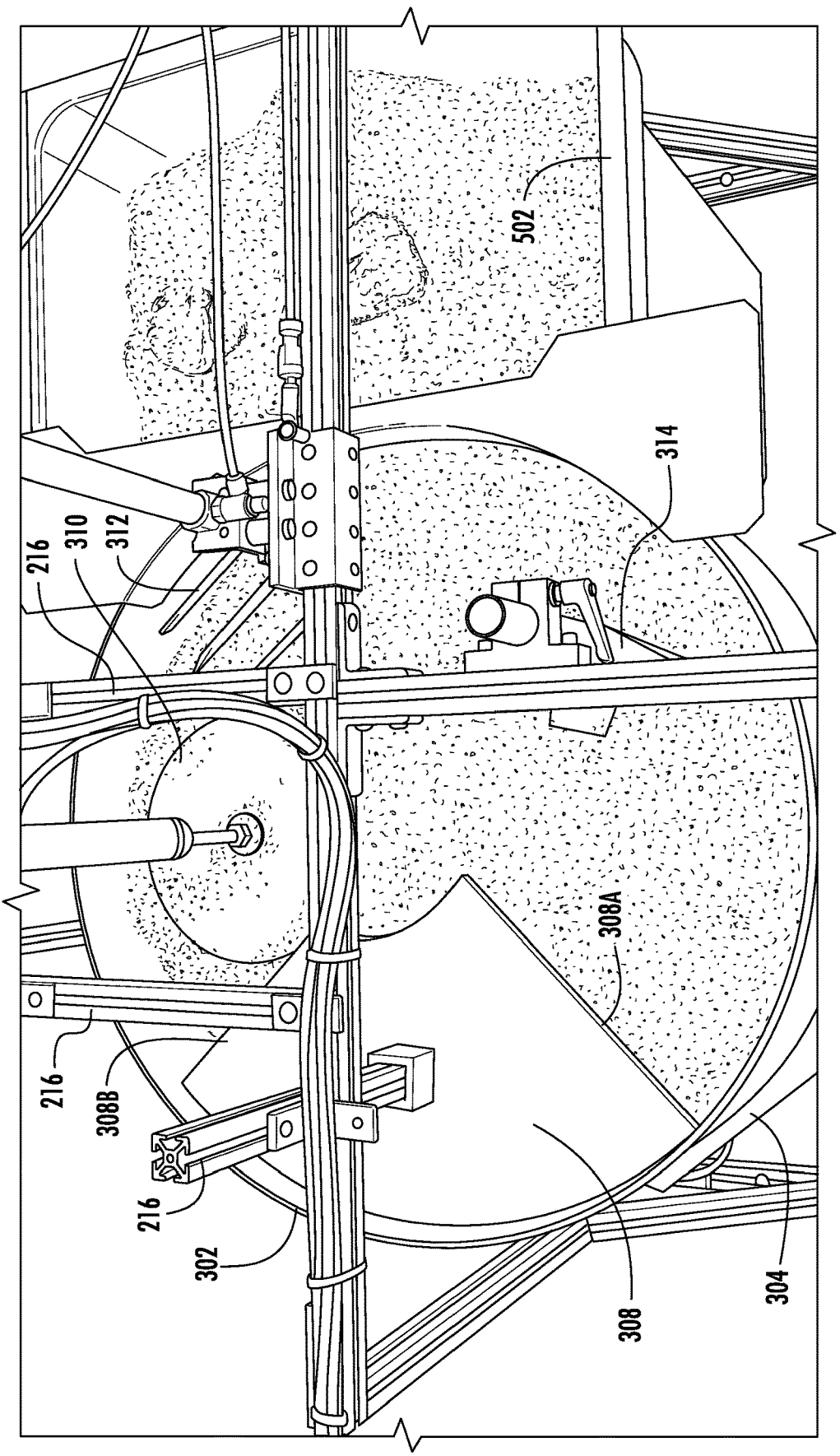

The cycle 1000 may further include operation 1018 in which the second coating material reservoir 302 is rotated by the motor 304 by a first angular increment as shown in FIG. 8C. In some embodiments, this rotation results in the first food item 401 entering the flow tumbler 308 at a first end 308A as shown in FIG. 8D. In some embodiments, the coating material distribution plow 314 may be configured to distribute the flow of the coating material during periods of rotation with respect to transfer surface 306 to evenly distribute the coating material (e.g., define a substantially uniform surface profile). Additionally, as the second coating material reservoir 302 begins to rotate, the item retrieval lift is lowered into the coating material reservoir 302 such that it is configured to receive first food item 401 at a first position. The cycle 1000 may further include operation 1020 in which the first food item is at least partially covered with the second coating material. As the first food item 401 is funneled through the flow tumbler 308, the second coating material is coated upon the first food item 401 as described above.

The cycle 1000 may further include operation 1022 in which the second coating material reservoir 302 is rotated at a second angular increment by the motor 304. In some embodiments, this second angular increment results in the first food item 401 exiting the flow tumbler 308 at the second end 308B and rotating such that the first food item 401 is positioned beneath the compression device 310. The compression device 310 may be lowered (e.g., vertically) into an extended configuration via the frame 216 as shown in FIG. 8E. The cycle 1000 may further include operation 1024 in which the first food item 401 and the second coating material are at least partially combined by way of compressive force (e.g. affixing the second coating material to the surface of the first food item).

In some embodiments, the item retrieval lift 312 is configured to move from a first position within the second coating material reservoir 302, to a second position above the second coating material reservoir 302, to a third position above a third food item reservoir 502, and back to position two above the second coating material reservoir 302 via frame 216 between each period of rotation as shown in FIGS. 8E-8H. This movement may be performed simultaneously with other operations such as operation 1024 in which the first food item 401 and second coating material are combined by way of compressive force. Prior to the third angular increment, the item retrieval lift 312 is returned to position one within the second coating material reservoir 302.

The cycle 1000 may further include operation 1026 in which the second coating material reservoir is rotated at a third angular increment. In some embodiments, this third angular increment results in the now coated first food item 401 moving onto at least a portion of the item retrieval lift 312 in first position such that the coated first food item 401 is retained by the item retrieval lift 312. In some embodiments, the angular increments described herein may be the same such as instances in which each of the respective components are located in 90-degree increments about the second coating material reservoir 302.

Figure 9A:
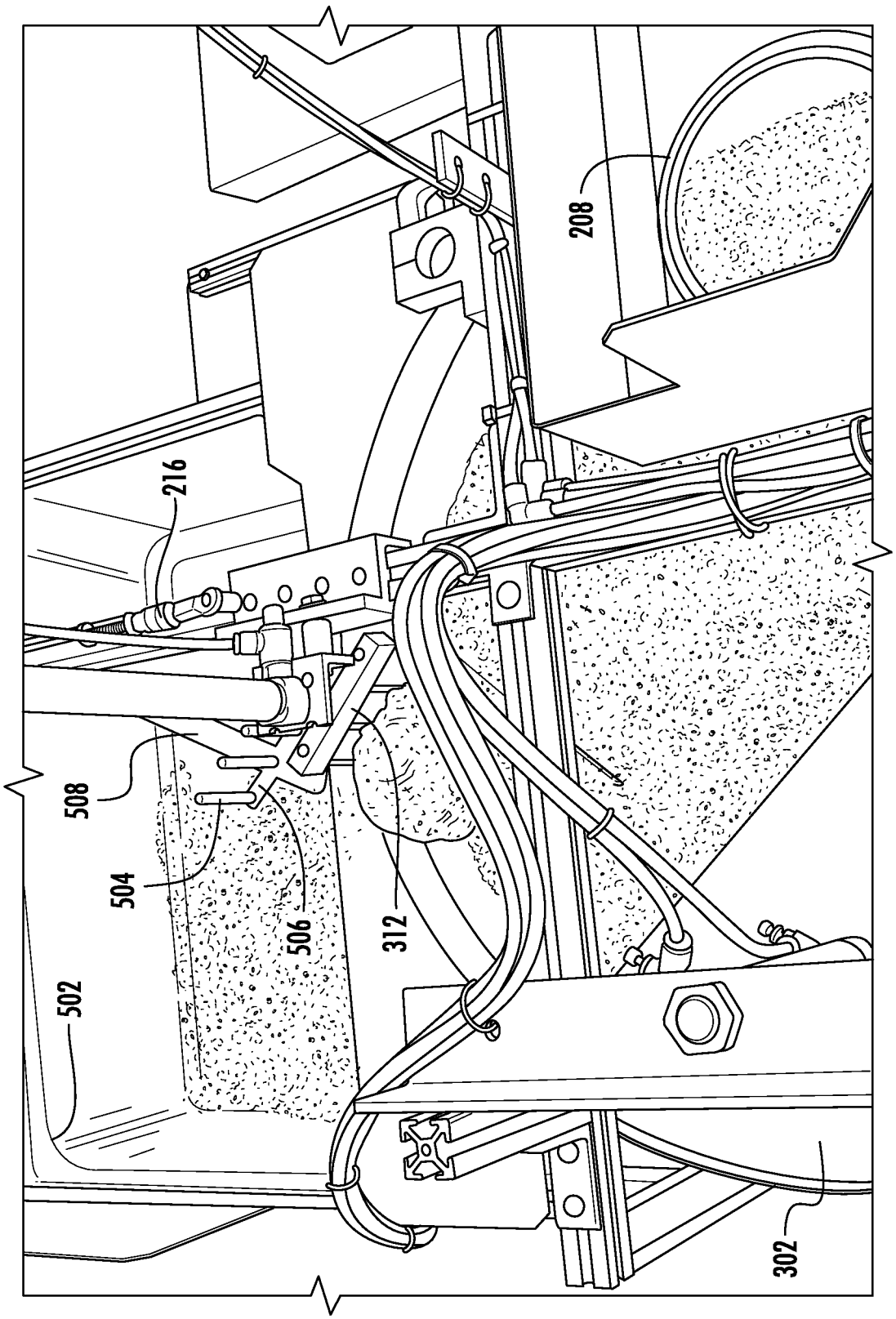

With reference to FIGS. 9A-9E, performance of the cycle 1000 is further described with reference to the third subsystem 103. Once the coated first food item 401 is received by the item retrieval lift 312, the item retrieval lift 312 may move to second position via frame 216 such that the item retrieval lift 312 is vertically above the second coating material reservoir 302 as shown in FIG. 9A. In some embodiments, the item retrieval lift 312 may be configured to pause at this position to allow excess of the coating material to fall back into the second coating material reservoir 302. In some embodiments, the item retrieval lift 312 may begin to move to the third positioned above the third food item reservoir 502. In some embodiments, an extruder 506 with prongs 504 may be configured to also move from a position above the coating material reservoir 302 to a position above the third food item reservoir 502 as shown in FIG. 9B.

Figure 9C:
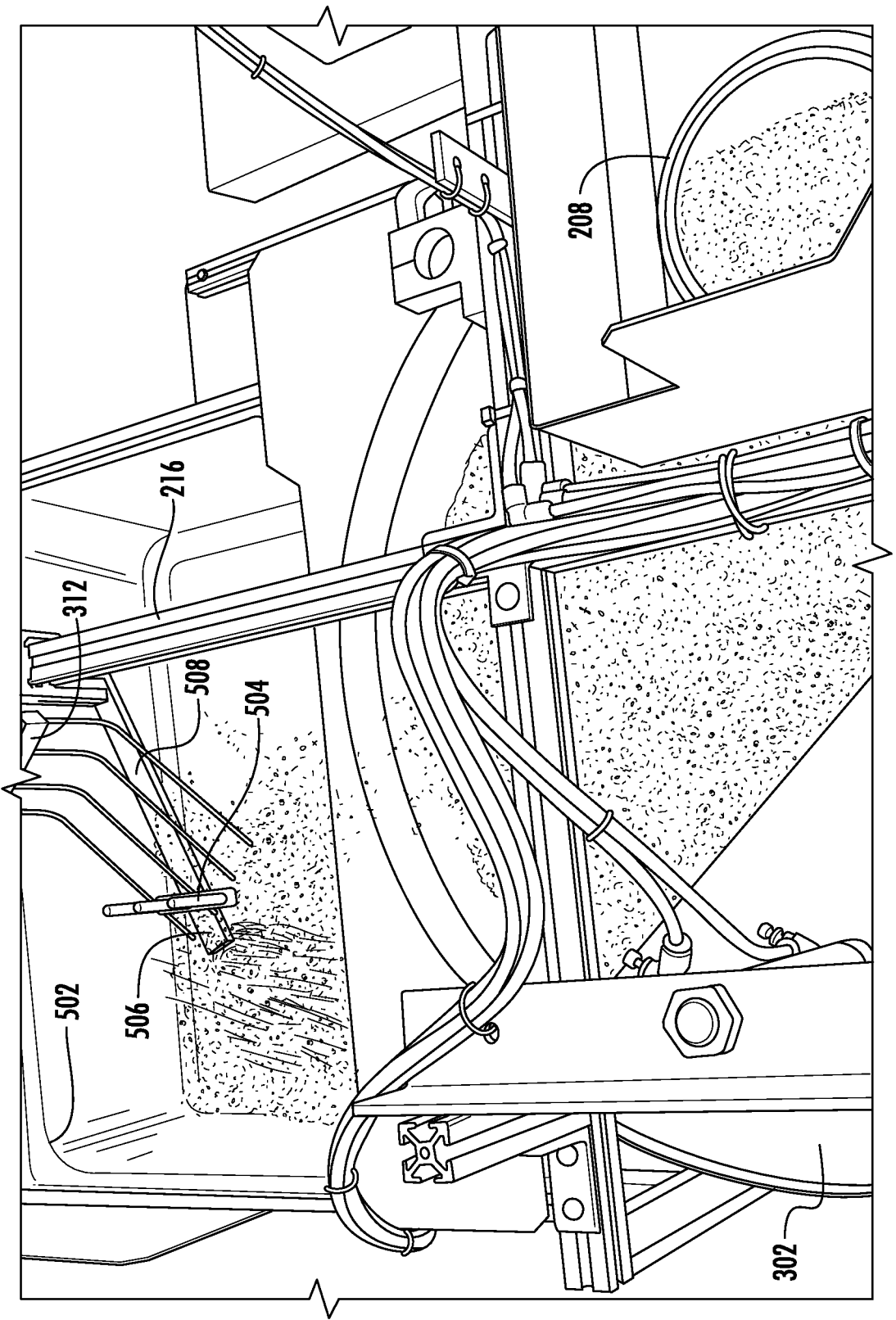
Figure 9D:
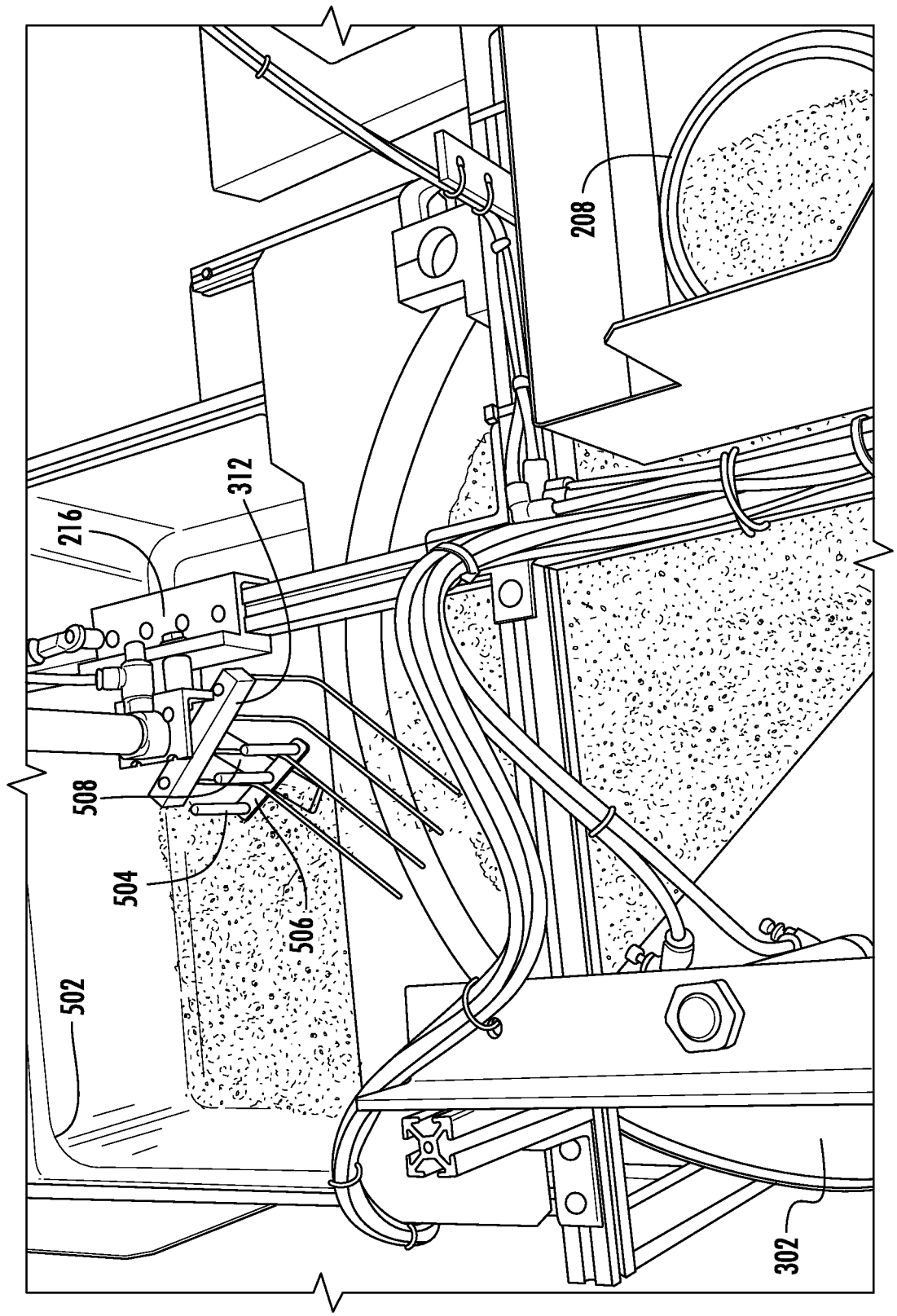
Figure 9E:
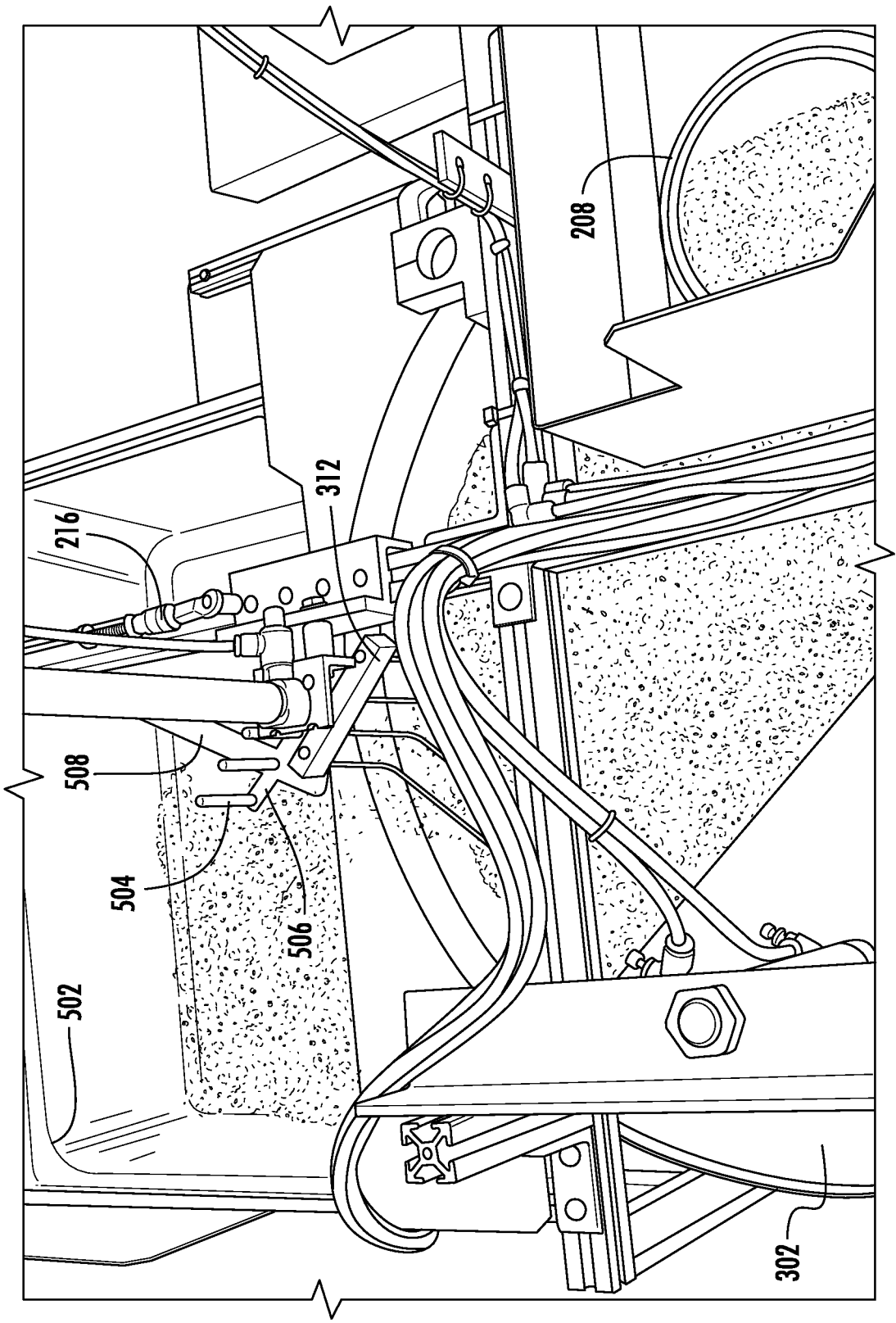

The cycle 1000 may further include operation 1028 in which the coated first food item 401 is deposited into a third food item reservoir 502. As the item retrieval lift 312 retaining the coated first food item 401 moves to a third position above the third food item reservoir 502 via frame 216, the item retrieval lift 312 may engage with the extruder 506. In some embodiments, once above the third food item reservoir 502, the item retrieval lift 312 containing the coated first food item 401 may move via the frame 216 such that the coated first food item 401 is pushed from the item retrieval lift 312 using the prongs 504 into the third food item reservoir 502 as shown in FIG. 9C. In some embodiments, once the coated first food item is deposited in the third food item reservoir 502, the item retrieval lift 312 and extruder 506 may return to positions above the coating material reservoir as shown in FIGS. 9D-E.

The cycle 1000 may further include operation 1030 comprising an ending procedure. Optionally, once cycle 1000 is complete as indicated by operation 1030, the cycle may further include operation 1032 which repeats this process. Operation 1032 may be configured to be provided by a user (e.g., via a user interface 616) or may, in some embodiments, be automatically initiated (e.g., via a processor 612). As described above, the cycle 1000 may be performed continuously such that a first food item is simultaneously located in an immediately preceding operation. Said differently, completion of the cycle 1000 is not required before subsequent interactions of the cycle 1000 may begin.

FIG. 11 illustrates a schematic view of an automated food coating system and related circuitry components. As described above, one or more housings 112 may enclose or otherwise support the various structural components of the automated food coating system 100 directly and/or indirectly. In some embodiments, the automated food coating system 100 may be formed as a modular system such that additional modular units 624 (e.g., ovens, fryers, refrigeration systems, storage containers, collection trays, etc.) may be connected to or otherwise operate in conjunction with embodiments of the automated food coating system 100 described above.

In addition to the structural components of the automated food coating system 100, as shown in FIG. 11, one or more circuitry components may be employed to control operation of the elements described herein. For example, the automated food coating system 100 may include control circuitry 602 configured to, in whole or in part, control operation of one or more of the retrieval arm 212, the attachment apparatus 214, extraction arm 508, the item retrieval lift 312, frame 216, second coating material reservoir 302 rotation, or the like. The control circuitry 602 may include a memory 608, processor 612, power supply 610, software 613, cooking sensor(s) 606, motion sensor(s) 604, or the like. In an example embodiment, the processor 612 may be configured to execute instructions stored in the memory 608 or otherwise accessible to the processor 612. Whether configured by hardware or by a combination of hardware with software, the processor 612 may represent an entity (e.g., physically embodied in circuitry) capable of performing operations according to an embodiment of the present invention while configured accordingly. By way of example, the processor 612 may receive instructions from the memory 608 for controlling movement of one or more of the retrieval arm 212, the attachment apparatus 214, extraction arm 508, the item retrieval lift 312, frame 216, second coating material reservoir 302 rotation, or the like. The processor 612 may further receive sensor data from the motion sensors 604 (e.g., optical sensors, limit switches, etc.), and/or the fill sensor 606 (e.g., weight sensors, volume sensors, etc.) and control movement of the one or more of the retrieval arm 212, the attachment apparatus 214, extraction arm 508, the item retrieval lift 312, frame 216, coating material reservoir 302 rotation, or the like based upon the sensor data.

The automated food coating system 100 may further include a drive system 614 that includes a motor (e.g., DC motors, stepper motors, servo motors, and/or the like). Furthermore, the drive system 614 may employ a gearbox, linear actuator, belts, chains, lead screws, couplings, rollers, the like, or combinations thereof necessary to drive operation of one or more of the retrieval arm 212, the attachment apparatus 214, the extraction arm 508, the item retrieval lift 312, frame 216, coating material reservoir 302 rotation, or the like. The frame 216, as illustrated in FIG. 11 and described herein, with respect to the preceding figures, may include one or more components describe herein with respect to the automated food coating system 100 or subsystems thereof (e.g., retrieval arm 212, attachment apparatus 214, extraction arm 508, item retrieval lift 312, rotatable basket 700, or the like) and/or any additional specialized components (e.g., bearings, bushing, races, angle brackets, angle irons, box beams, I-beams, rack-and-pinion, worm gears, channel, magnets, wire harness, nuts, bolts, screws, zip ties, etc.) as necessary to control operation thereof.

In some embodiments, the automated food coating system 100 may include a user interface 616 to facilitate user interaction and operation, if necessary, of the system elements described above. As shown, the user interface 616 may include an input device 618 (e.g., keyboard, touch screen, touch pad, buttons, dials, switches, levers, toggles, sliders, camera, scanner, mouse, joystick, biometric sensor, microphone, etc.) and/or an output device 620 (e.g., display device, screen, speakers, lights, buzzer, signal emitter, printer, etc.).

CONCLUSION

While some embodiments described herein relate to automated food coating systems (e.g., battering and breading chicken prior to frying operations), and other particular food preparation and storage, one of ordinary skill in the art will appreciate that the teachings herein may also apply to a wide range of additional coating, storage, and organizational applications. Some such additional applications may include coating, tumbling, and/or drying of manufactured materials (e.g., zinc plating nuts and bolts, etc.). The embodiments described herein may also be scalable to accommodate at least the aforementioned applications. Various components of embodiments described herein can be added, removed, reorganized, modified, duplicated, or the like as one skilled in the art would find convenient and/or necessary to implement a particular application in conjunction with the teachings of the present disclosure. In some embodiments, specialized features, characteristics, materials, components, and/or equipment may be applied in conjunction with the teachings of the present disclosure as one skilled in the art would find convenient and/or necessary to implement a particular application.

Moreover, many modifications and other embodiments of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of any appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of any appended claims. In this regard, for example, different combinations of elements and/or functions than those explicitly described above are also contemplated as can be set forth in some of any appended claims. Although specific terms are employed herein, they are used in a generic and descriptive sense only and not for purposes of limitation.

That which is claimed is:

1. A system for coating a food item, the system comprising:
    a flow tumbler, comprising a body, wherein the body comprises:
        a first end configured to receive a food item;
        a second end opposite the first end; and
        a flow channel defined by an inner surface of the body extending between the first end and the second end; and
    a coating material reservoir configured to support a coating material therein and configured to rotate about an axis,
        wherein, in an instance in which the food item is rotated by rotation of the coating material reservoir into the body via the first end, the flow channel is configured to redirect and distribute the coating material about the food item before the food item exits the body via the second end, and
    a compression device suspended above the coating material reservoir, wherein the compression device comprises;
        a pressing surface, and
        an actuator, and
        wherein the actuator is configured to move the pressing surface between:
            an extended configuration in which a pressing surface at least partially contacts the food item exiting the body of the flow tumbler via the second end; and
            a retracted configuration in which contact between the pressing surface and the food item is precluded.

2. The system according to claim 1, wherein a first cross-sectional area of the flow channel at the first end is larger than a second cross-sectional area of the flow channel at the second end.

3. The system according to claim 1, wherein the inner surface of the body defining the flow channel further defines a pair of converging concave surfaces configured to collectively distribute the coating material about the food item.

4. The system according to claim 1, wherein the body is configured to receive the food item having a first orientation via the first end, and the flow channel is configured to reorient the food item to a second orientation before the food item exits the body via the second end.

5. The system according to claim 1, further comprising a coating material distribution plow configured to redistribute the coating material within the coating material reservoir.

6. The system according to claim 5, wherein the coating material distribution plow further defines one or more prongs extending at least partially into the coating material supported by the coating material reservoir, wherein, in an instance in which the coating material reservoir rotates about the axis, the one or more prongs are configured to redistribute the coating material within the coating material reservoir to a substantially uniform surface profile.

7. The system according to claim 1, further comprising an item retrieval lift configured to move relative the coating material reservoir and retrieve one or more coated food items from the coating material reservoir.

* * * * *